(12) United States Patent
Lee

(10) Patent No.: US 11,201,455 B1
(45) Date of Patent: Dec. 14, 2021

(54) TEMPORARY ELECTRICAL PANEL

(71) Applicant: Richard Lee, Leander, TX (US)

(72) Inventor: Richard Lee, Leander, TX (US)

( * ) Notice: Subject to any disclaimer, the term of this patent is extended or adjusted under 35 U.S.C. 154(b) by 0 days.

(21) Appl. No.: 16/897,840

(22) Filed: Jun. 10, 2020

(51) Int. Cl.
*H02B 1/052* (2006.01)
*H02B 1/03* (2006.01)
*H02B 1/06* (2006.01)
*H01R 25/00* (2006.01)

(52) U.S. Cl.
CPC ............... *H02B 1/052* (2013.01); *H02B 1/03* (2013.01); *H02B 1/066* (2013.01); *H01R 25/006* (2013.01)

(58) Field of Classification Search
CPC ....................................................... H02B 1/52
See application file for complete search history.

(56) References Cited

U.S. PATENT DOCUMENTS

| | | | |
|---|---|---|---|
| 2,018,272 A * | 10/1935 | Lunas | G01R 1/30 324/114 |
| 2,317,667 A * | 4/1943 | Chandler | H02B 1/52 200/50.13 |
| 3,631,324 A | 12/1971 | Jones | |
| 3,786,312 A * | 1/1974 | Roussard | H02B 1/52 361/643 |
| 4,157,501 A | 6/1979 | Cain et al. | |
| 4,318,156 A * | 3/1982 | Gallagher | H02B 1/52 307/147 |
| 5,136,463 A | 8/1992 | Webster | |
| 5,166,887 A | 11/1992 | Farrington et al. | |
| 5,544,003 A * | 8/1996 | Vaughan | H02B 1/24 248/129 |
| 5,574,612 A | 11/1996 | Pak | |
| 5,574,622 A * | 11/1996 | Brown | F02B 63/04 307/150 |
| 5,696,695 A | 12/1997 | Ehlers et al. | |
| 5,784,249 A | 7/1998 | Pouliot | |
| 5,994,892 A | 11/1999 | Turino et al. | |
| 6,037,749 A | 3/2000 | Parsonage | |
| 6,055,145 A | 4/2000 | Lagree et al. | |
| 6,266,233 B1 | 7/2001 | O'Regan | |
| 6,404,620 B1 * | 6/2002 | Piccione | H02B 1/52 248/129 |
| 6,507,794 B1 | 1/2003 | Hubbard et al. | |
| 6,621,689 B1 * | 9/2003 | Flegel | H01H 9/26 200/50.32 |

(Continued)

FOREIGN PATENT DOCUMENTS

FR 2691849 A1 * 12/1993 ............... H02B 1/52

*Primary Examiner* — Robert J Hoffberg
(74) *Attorney, Agent, or Firm* — Sean Christian Connolly

(57) ABSTRACT

Disclosed herein is an apparatus for providing and monitoring a temporary electrical supply, which comprises a portable electrical panel with an array of circuit breakers, an array of electrical plugs for supplying a temporary source of electricity, and an array of amp and voltage meters that detect information needed for each corresponding phase. The Temporary Electrical Panel is supplied by a 50-amp cord and has a 40-amp main breaker. Each electrical plug is rated at 20 amps, tamper resistant, and GFCI protected, with a dedicated 20-amp breaker. The electrical plugs may also be color coded to differentiate which phase they are on. Additionally, the Temporary Electrical Panel comprises a plastic backing board with handle cut outs or a handle, which allow the Temporary Electrical Panel to be carried.

12 Claims, 20 Drawing Sheets

(56) References Cited

U.S. PATENT DOCUMENTS

| | | | |
|---|---|---|---|
| 6,624,532 B1 | 9/2003 | Davidow et al. | |
| 6,735,535 B1 | 5/2004 | Kagan et al. | |
| 6,801,425 B2 * | 10/2004 | Buck | F02B 63/04 307/153 |
| 7,209,804 B2 | 4/2007 | Curt et al. | |
| 7,224,578 B2 * | 5/2007 | Buck | F02B 63/04 307/153 |
| 7,848,085 B2 * | 12/2010 | Gerber | H02B 1/52 361/625 |
| 7,962,298 B2 | 6/2011 | Przydatek et al. | |
| 8,204,709 B2 | 6/2012 | Presher et al. | |
| 8,447,541 B2 | 5/2013 | Rada et al. | |
| 8,467,171 B2 * | 6/2013 | Brown | H02B 1/52 361/625 |
| 8,599,536 B1 * | 12/2013 | Jorgensen | H02B 1/52 361/623 |
| 8,930,152 B2 * | 1/2015 | Patel | G01R 15/207 702/62 |
| 10,044,197 B2 * | 8/2018 | Fry | H02J 7/0027 |
| 10,135,361 B2 | 11/2018 | Dent | |
| 10,742,033 B2 * | 8/2020 | Saylor | H02B 1/52 |
| 2009/0109605 A1 * | 4/2009 | Blake | H02B 1/52 361/625 |
| 2010/0103592 A1 * | 4/2010 | Neumann | H02B 1/52 361/625 |
| 2010/0232093 A1 * | 9/2010 | Kaminski | H02B 1/52 361/623 |
| 2011/0004357 A1 | 1/2011 | Mathiowetz | |
| 2013/0231793 A1 | 9/2013 | Elliott et al. | |
| 2021/0273418 A1 * | 9/2021 | Stier | H02J 13/00002 |

* cited by examiner

TEMPORARY ELECTRICAL PANEL

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention is in the technical field of electrical devices. More particularly, the preferred embodiments of the present invention relate generally to electrical panels. More particularly, the preferred embodiments of the present invention relate generally to electrical panels with monitoring capabilities. More particularly, the preferred embodiments of the present invention relate generally to electrical panels, which monitor voltage and/or current. More particularly, the preferred embodiments of the present invention relate generally to portable temporary electrical panels, which monitor voltage and/or current.

2. Description of the Related Art

The broad concept of electrical panels is known. However, most of these devices are permanently installed and do not have integrated monitoring capability.

Devices that monitor voltage and/or current are also known. However, these inventions are not usually integrated into temporary electrical panels.

Monitoring electrical panels is also known. However, these devices are usually used for permanently installed electrical panels and are not used with temporary electrical panels.

It is also known to use electrical panels that monitor voltage and/or current. However, these inventions are usually intended for permanently installed electrical panels and are not used with temporary electrical panels.

Temporary electrical panels are known, as well. However, these inventions do not have integrated monitoring capability for current and voltage.

SUMMARY OF THE INVENTION

On occasions, it is desirable to provide temporary power to a location. For example, during new construction, remodeling, or repair of a structure, primary power may not be readily available during the early stages, and a temporary power source must be used to power equipment and utilities during this period. Frequently, temporary electrical power may be provided in a haphazard manner, which creates risks of failures from an excessive load being placed on the temporary electrical power system if too many electrical devices are being used simultaneously. Problems often arise when temporary electrical power is supplied without proper distribution and monitoring of the temporary power source, which can result in insufficient power, fires, electrical shock, damaged equipment, or other detrimental outcomes. Thus, there is a need to provide a temporary electrical panel, which can provide distributed power that is monitored for voltage and current. The Temporary Electrical Panel invention was developed in part to provide an apparatus for providing and monitoring a temporary supply electrical power. In broad embodiment, the Temporary Electrical Panel invention relates to an apparatus, which provides a portable electrical supply with an array of circuit breakers, and an array of electrical plugs with built-in voltage and amp meters for monitoring the corresponding phase or leg. More particularly, the Temporary Electrical Panel invention related to an apparatus for providing and monitoring a temporary electrical supply, which comprises a portable electrical panel with an array of circuit breakers, an array of electrical plugs for supplying a temporary source of electricity, and an array of amp and voltage meters that detect information needed for each corresponding phase. The Temporary Electrical Panel is supplied by a 50-amp cord and has a 40-amp main breaker. Each electrical plug is rated at 20 amps, tamper resistant, and GFCI protected, with a dedicated 20-amp breaker. The electrical plugs may also be color coded to differentiate between phases. Additionally, the Temporary Electrical Panel comprises a plastic backing board with handle cut outs or handles, which allow the Temporary Electrical Panel to be carried.

In the more preferred embodiments, the present invention relates to a portable apparatus for providing and monitoring a temporary electrical supply, said apparatus comprising: an outer cover, said outer cover comprising a top panel, said top panel comprising: one or more handles, said handles being capable of supporting said apparatus; a front panel, said front panel comprising: a front panel hinge, and an electrical plug panel, said electrical plug panel depending from said front panel hinge and being capable of opening, said electrical plug panel comprising: a front latch, a meter array, said meter array comprising: one or more amp meters, said amp meters being capable of detecting current information, and one or more voltage meters, said voltage meters being capable of detecting voltage information; and an electrical plug array, said electrical plug array comprising: one or more electrical plugs, each said electrical plug being capable of being monitored by said amp meters and said voltage meters; a rear panel, said rear panel comprising: a rear panel hinge, and a rear panel door, said rear panel door depending from said rear panel hinge and being capable of opening, said rear panel door comprising: a rear latch; a right-side panel, said right-side panel comprising: a power supply receiver, and a power switch panel, said power switch panel comprising: a power switch; a left-side panel; and a bottom panel; support skids, said support skids depending from said bottom panel of said outer cover; and a breaker compartment, said breaker box being disposed behind said rear panel door, said breaker compartment comprising: a circuit breaker array, said circuit breaker array comprising: a main breaker, and one or more dedicated breakers, each said one or more dedicated breakers being for one said electrical plug; wherein temporary electrical power is supplied through said power supply receiver, through said main breaker, through said one or more dedicated breakers, and out of said one or more electrical plugs; and wherein said temporary electrical power for each said one or more electrical plugs is monitored by said one or more amp meters and said one or more voltage meters.

In the most preferred embodiments, the present invention relates to a portable apparatus for providing and monitoring a temporary electrical supply, said apparatus comprising: a back board, said backboard comprising one or more handles, said handles being capable of supporting said apparatus; a breaker box, said breaker box being mounted on said back board, said breaker box comprising: a breaker box door, a circuit breaker array, said circuit breaker array comprising: a main breaker, and one or more dedicated breakers; a power supply receiver, said power supply receiver being connected to said breaker box through a power supply conduit; an outlet box, said outlet box being mounted to said back board and connected to said breaker box, said outlet box comprising: a meter array, said meter array comprising: one or more amp meters, said amp meters being capable of detecting current information, and one or more voltage meters, said voltage meters being capable of detecting voltage information; and an electrical plug array, said electrical plug array comprising: one or more electrical plugs, each said electrical plug having one said dedicated breaker and being capable of being monitored by said amp meters and said voltage meters; wherein temporary electrical power is supplied through said power supply receiver, through said main breaker, through said one or more dedicated breakers, and out of said one or more electrical plugs; and wherein said temporary electrical power for each said one or more electrical plugs is monitored by said one or more amp meters and said one or more voltage meters. In sum, the Temporary Electrical Panel invention provides a safe and convenient means of supplying a portable monitored temporary electrical power source.

BRIEF DESCRIPTION OF THE DRAWING

Illustrative and preferred embodiments of the present invention are shown in the accompanying drawings in which.

DETAILED DESCRIPTION OF THE PREFERRED EMBODIMENTS

For the purpose of illustration, the present invention is shown in the most preferred embodiment of a temporary electrical panel apparatus, which provides an array of monitored electric plugs and is portable. Additionally, present invention is shown in the more preferred embodiment of a temporary electrical panel apparatus with support skids and access doors, which provides an array of monitored electric plugs and is portable. These embodiments are not intended to limit the scope of the present invention.

Figure 1:
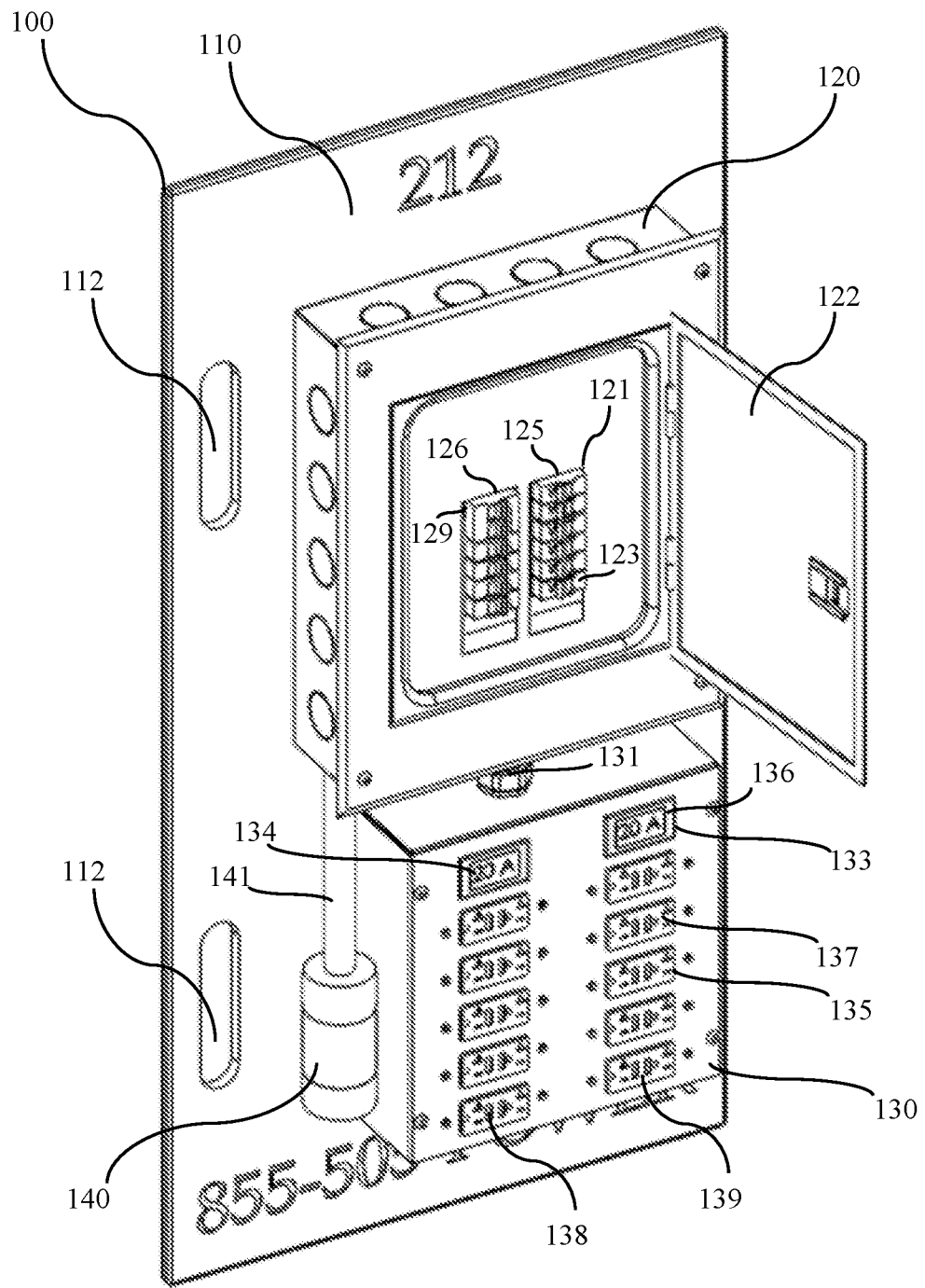
FIG. 1 is a front perspective view of the most preferred embodiment of an apparatus of the present invention.
Figure 2:
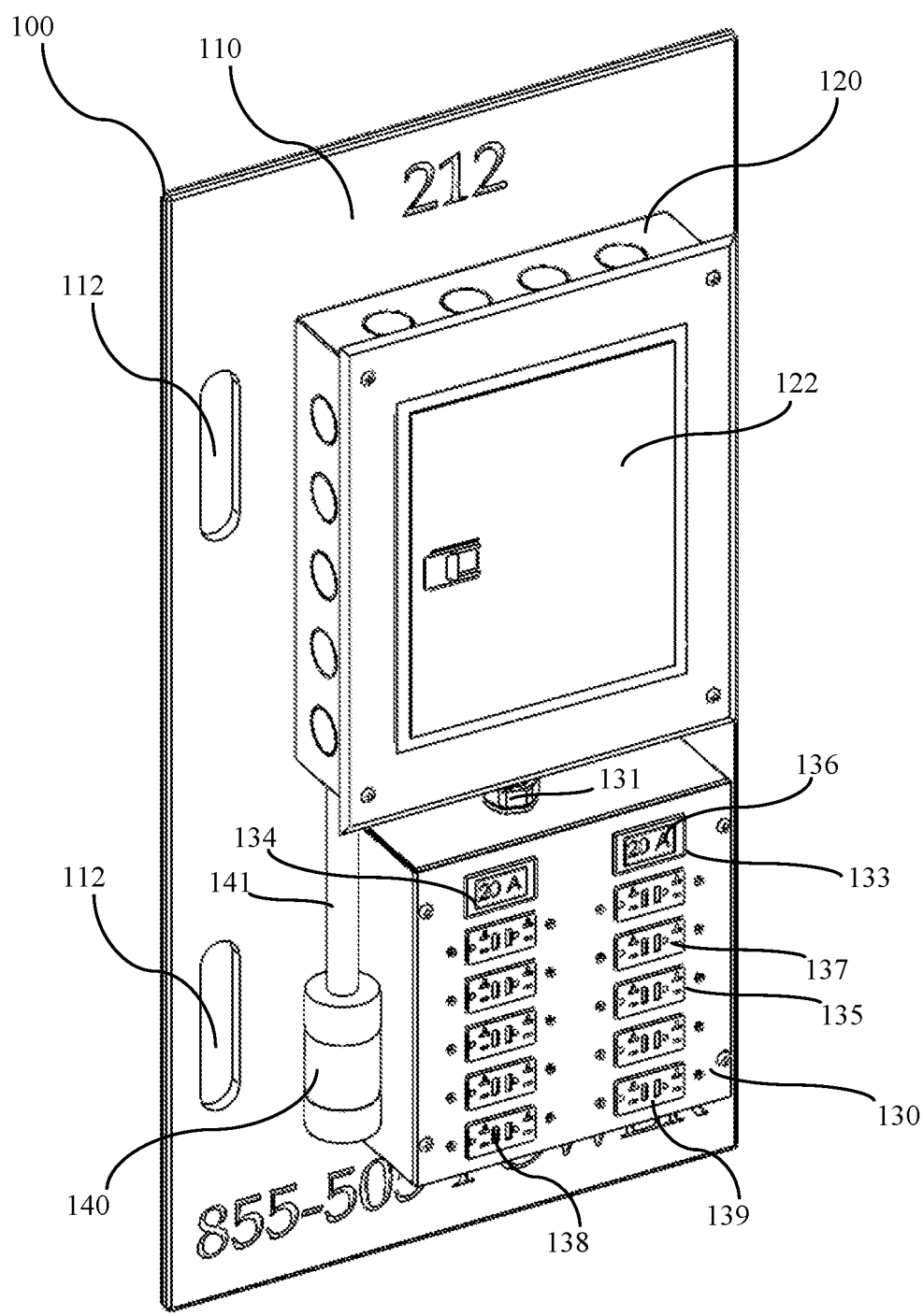
FIG. 2 is a front perspective view of an apparatus of FIG. 1.
Figure 3:
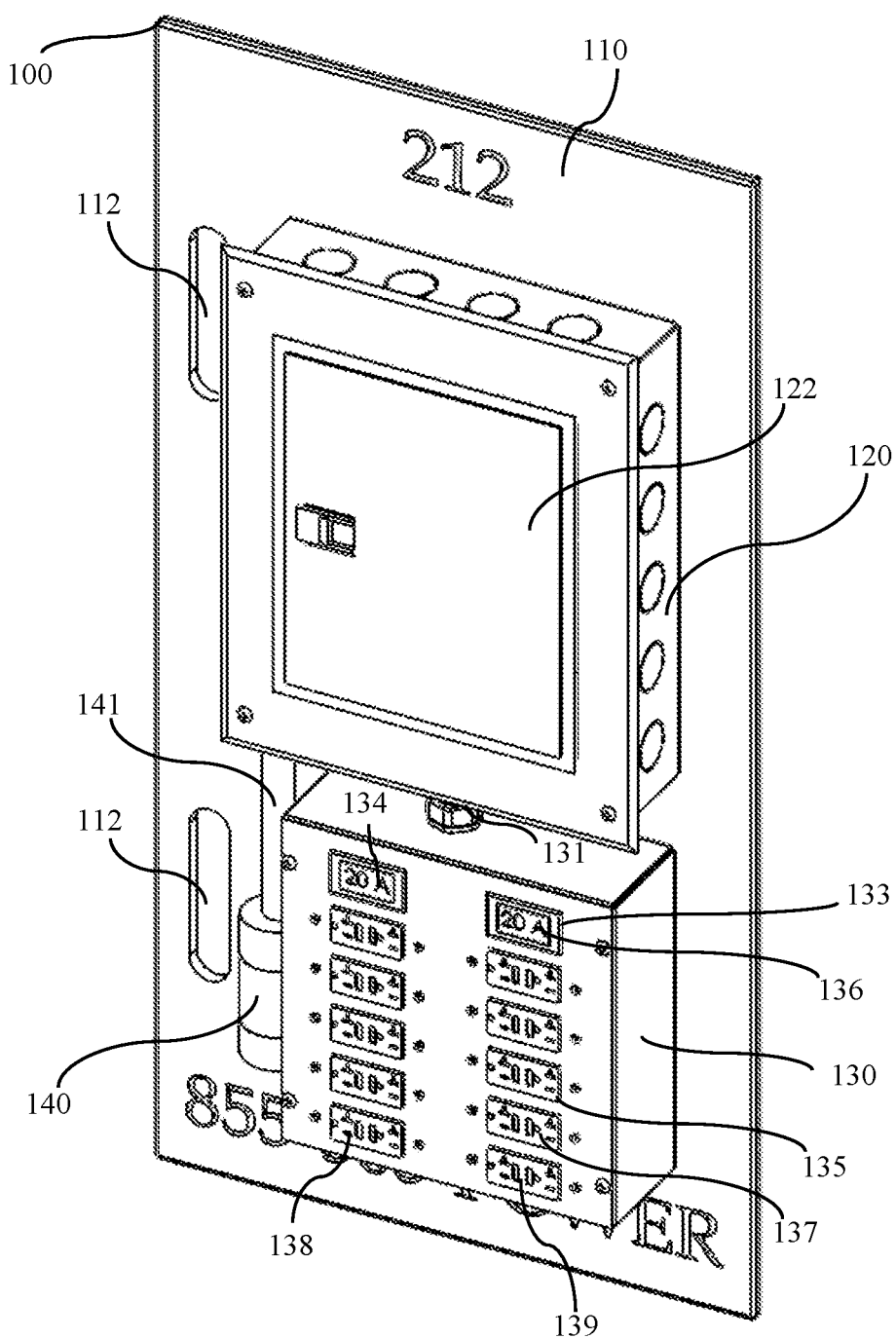
FIG. 3 is a front perspective view of an apparatus of FIG. 1.
Figure 4:
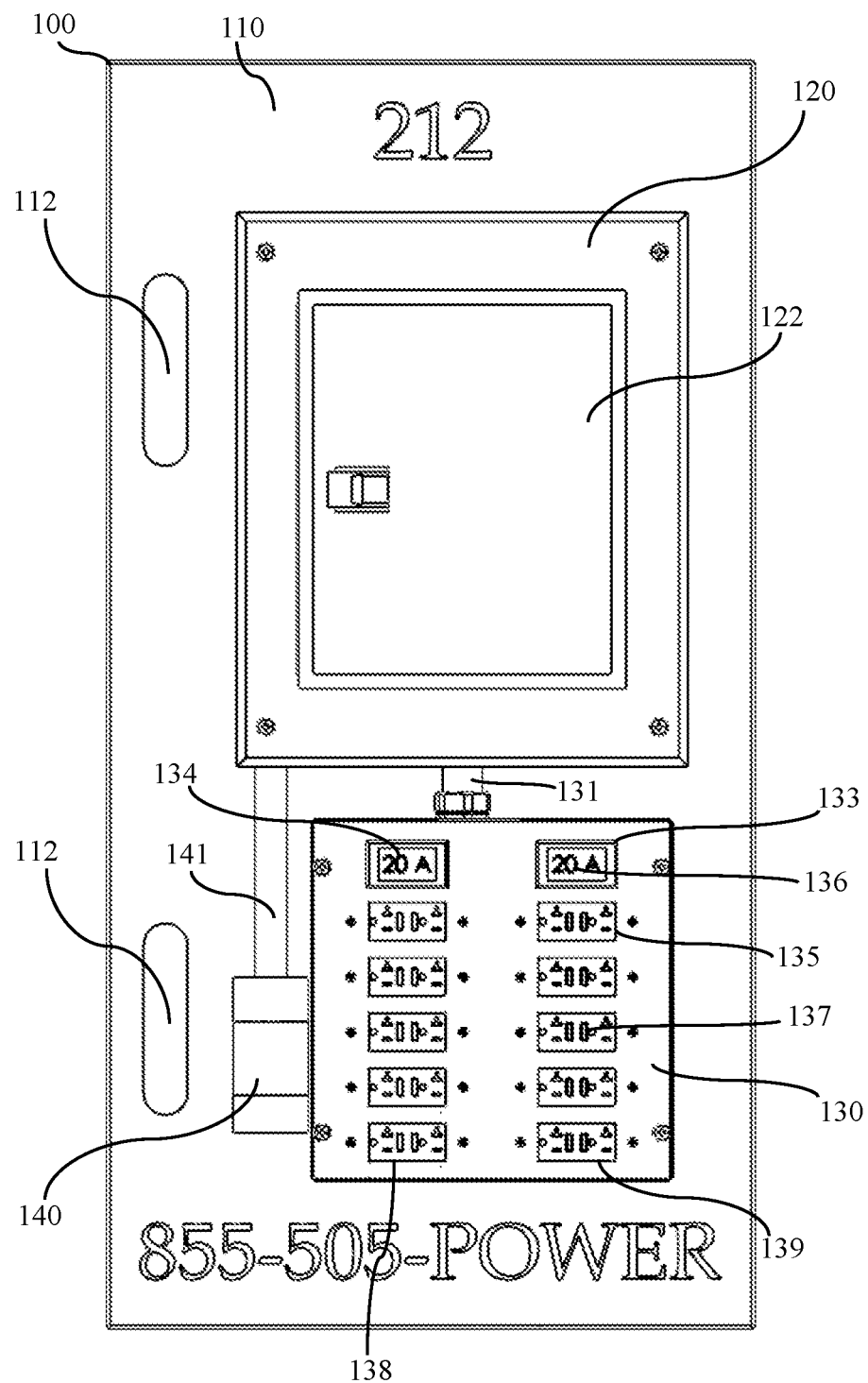
FIG. 4 is a front view of an apparatus of FIG. 1.
Figure 5:
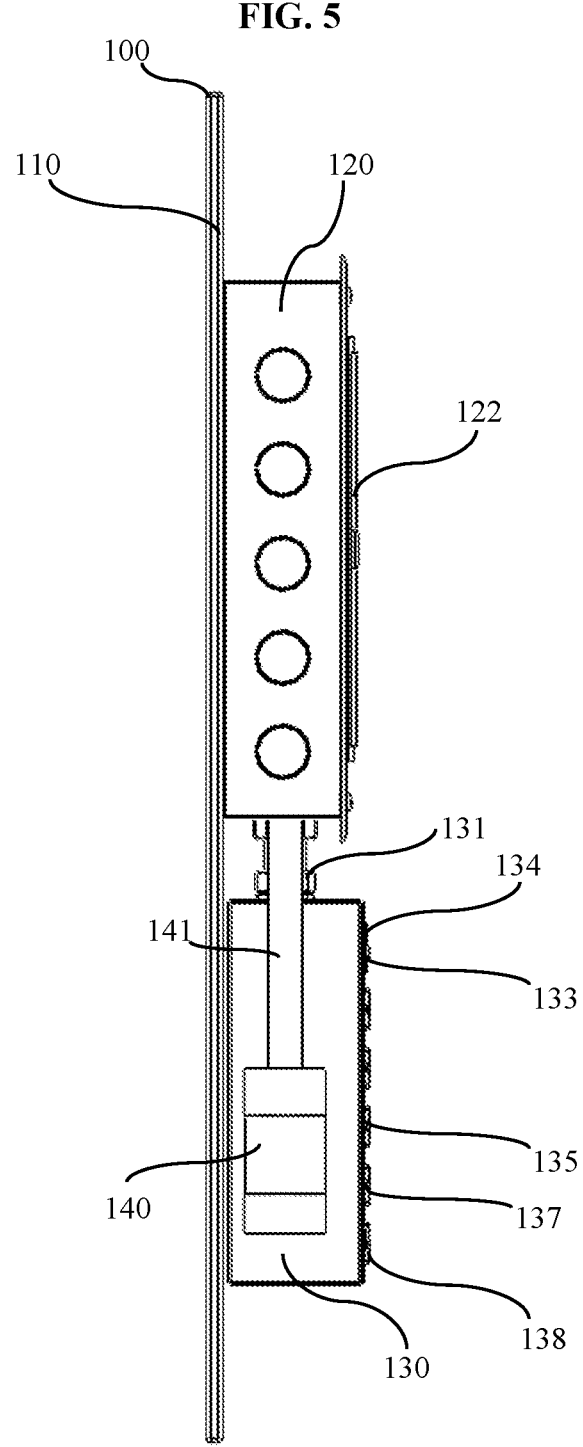
FIG. 5 is a left side view of an apparatus of FIG. 1.
Figure 6:
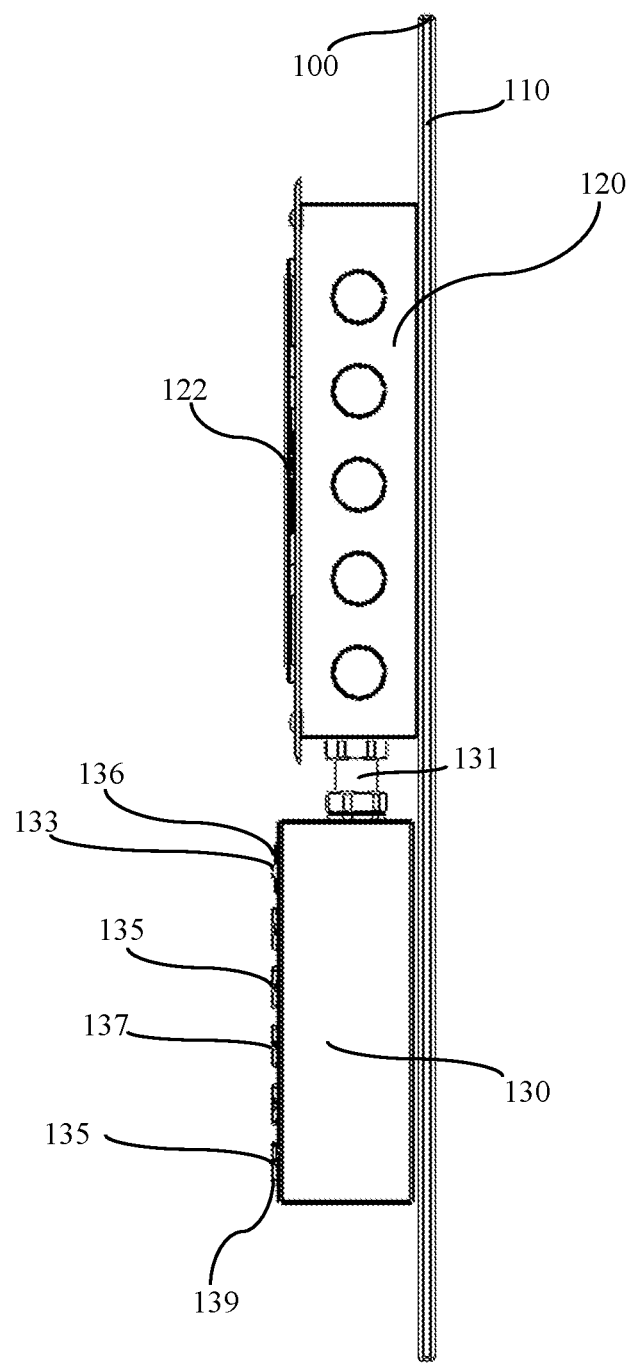
FIG. 6 is a right side view of an apparatus of FIG. 1.
Figure 7:
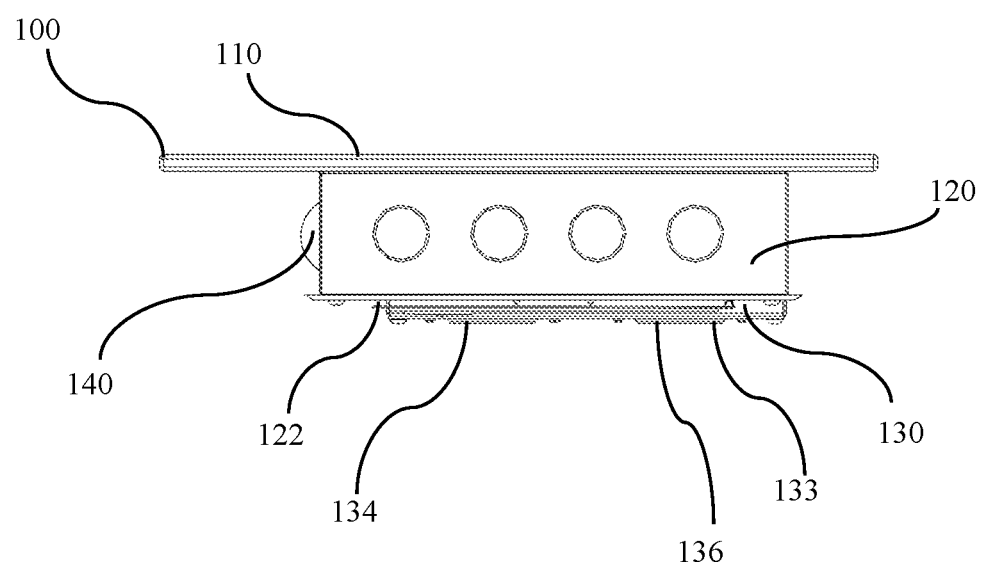
FIG. 7 is a top view of an apparatus of FIG. 1.
Figure 8:
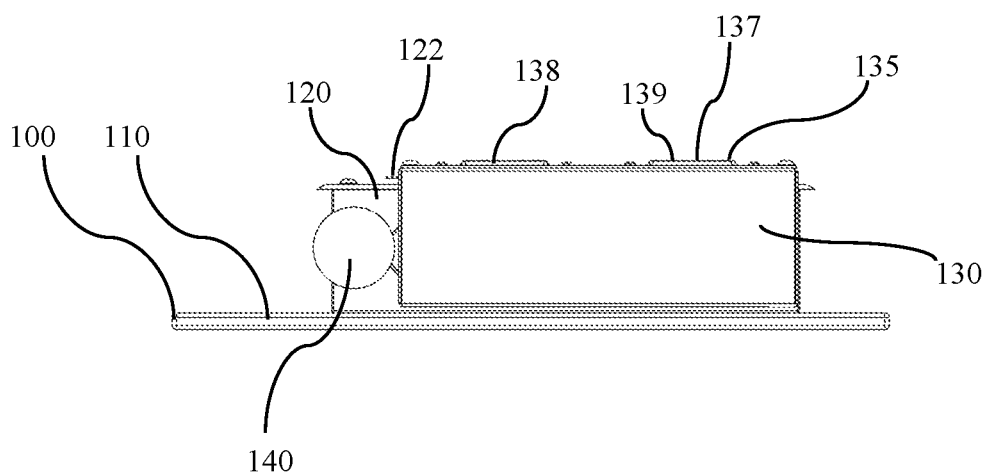
FIG. 8 is a bottom view of an apparatus of FIG. 1.

The Temporary Electrical Panel invention was developed in part to provide an apparatus for providing and monitoring a temporary supply electrical power. Referring now to the most preferred embodiment of the invention, in FIG. 1, FIG. 2, FIG. 3, FIG. 4, FIG. 5, FIG. 6, FIG. 7, and FIG. 8, a Temporary Electrical Panel 100 is shown. FIG. 1 illustrates a front perspective view of a Temporary Electrical Panel 100 with the breaker box door 122 open. FIG. 2 depicts a front perspective view of a Temporary Electrical Panel 100 with the breaker box door 122 closed. FIG. 3 shows another front perspective view of a Temporary Electrical Panel 100 with the breaker box door 122 closed from a different angle. FIG. 4 displays a front view of a Temporary Electrical Panel 100 with the breaker box door 122 closed. FIG. 5 shows a left side view of a Temporary Electrical Panel 100 with the breaker box door 122 closed. FIG. 6 depicts a right side view of a Temporary Electrical Panel 100 with the breaker box door 122 closed. FIG. 7 illustrates a top view of a Temporary Electrical Panel 100 with the breaker box door 122 closed. FIG. 8 demonstrates a bottom view of a Temporary Electrical Panel 100 with the breaker box door 122 closed.

Referring still to the most preferred embodiment of the invention, in FIG. 1, FIG. 2, FIG. 3, FIG. 4, FIG. 5, FIG. 6, FIG. 7, and FIG. 8, the Temporary Electrical Panel 100 is a portable apparatus for providing and monitoring a temporary electrical supply, which comprises a back board 110, a breaker box 120, a power supply receiver 140, and an outlet box 130. The back board 110 is a strong, rigid structure, which supports the breaker box 120, a power supply receiver 140, and an outlet box 130, and comprises one or more handles 112, which are capable of supporting the Temporary Electrical Panel 100 while it is being carried or moved around. The breaker box 120 is mounted on the back board 110 and comprises a breaker box door 122, and a circuit breaker array 121. The circuit breaker array 121 comprises a main breaker 129, a first phase circuit breaker array 125, a second phase circuit breaker array 126, and one or more dedicated breakers 123. The first phase circuit breaker array 125 and the second phase circuit breaker array 126 each handle electrical power at different phases. The power supply receiver 140 is connected to and depends from the breaker box 120 through a power supply conduit 141. The outlet box 130 is mounted on the back board 110, connected to the breaker box 120 through a breaker box conduit 131, and comprises a meter array 133 and an electrical plug array 135. The meter array 133 comprises one or more amp meters 134, which are capable of detecting current information from the electrical plug array 135, and one or more voltage meters 136, which are capable of detecting voltage information from the electrical plug array 135. Additionally, the one or more amp meters 134 and the one or more voltage meters 136 may be combined into one or more single computerized units with a display, which measures both current and voltage for each electrical plug and/or phase and displays the information at the user's option. The electrical plug array 135 comprises a first phase electrical plug array 138, a second phase electrical plug array 139, and one or more electrical plugs 137, with each of the electrical plugs 137 having one dedicated breaker 123 and being capable of being monitored by said amp meters 134 and said voltage meters 136. The first phase electrical plug array 138 and the second phase electrical plug array 139 each provide electrical power at different phases. During use, Temporary Electrical Panel 100 is moved to a location requiring temporary power using the handles 112, and temporary electrical power is supplied to the power supply receiver 140, then through the power supply conduit 141 to the main breaker 129 of the breaker box 120, through one or more dedicated breakers 123, and out of one or more electrical plugs 137, wherein the temporary electrical power for each electrical plugs 137 is monitored by the one or more amp meters 134 and the one or more voltage meters 136.

The construction details of the invention as shown in FIG. 1, FIG. 2, FIG. 3, FIG. 4, FIG. 5, FIG. 6, FIG. 7, and FIG. 8, are as follows. The back board 110 comprises a strong, rigid, and lightweight material, which is capable of supporting the Temporary Electrical Panel 100, such as plastic, wood, fiberglass, fiberboard, composite material, metal, steel, aluminum, metal alloy, or the like. The breaker box 120 comprises plastic, wood, fiberglass, fiberboard, composite material, metal, steel, aluminum, metal alloy, or the like. The power supply receiver 140 comprises a 50 amp plug or the like. The outlet box 130 comprises metal, steel, aluminum, metal alloy, wood, plastic, fiberglass, ceramic, composite material, or the like. The one or more handles 112 comprise metal, steel, aluminum, metal alloy, plastic, fiberglass, ceramic, composite material, or the like, or comprise cutouts in the back board 110. The breaker box door 122 comprises metal, steel, aluminum, metal alloy, plastic, fiberglass, ceramic, composite material, or the like. The circuit breaker array 121 comprises one or more main breakers 129 and one or more dedicated breakers 123 for one or more phases, or the like. The main breaker 129 comprises a standard breaker, preferably with a minimum rating of 40 amps, or the like. The first phase circuit breaker array 125 comprises one or more dedicated breakers 123 for a first phase, or the like. The second phase circuit breaker array 126 comprises one or more dedicated breakers 123 for a second phase, or the like. The one or more dedicated breakers 123 comprises standard breakers, preferably with a minimum rating of 20 amps, or the like. The power supply conduit 141 comprises a standard power cord, preferably a 50-amp cord, or the like. The breaker box conduit 131 comprises a standard power cord, preferably a 50-amp cord, or the like, and is covered in metal, steel, aluminum, metal alloy, plastic, fiberglass, ceramic, composite material, or the like. The meter array 133 comprises standard amp meters, which are capable of measuring current, and standard voltage meters, which are capable of measuring voltage, or combined amp-voltage meters, which are capable of measuring both current and voltage, or the like. The one or more amp meters 134 comprise standard amp meters, which measure electrical current, or combined amp-voltage meters, which measure both electrical current and voltage, or the like. The one or more voltage meters 136 comprise standard voltage meters, which are capable of measuring electrical voltage, or combined amp-voltage meters, which are capable of measuring both current and voltage, or the like. Additionally, the one or more amp meters 134 and the one or more voltage meters 136 may be combined into a single computerized unit with a display, which measures both current and voltage for each electrical plug 137 and/or phase and displays the information at the user's option. The electrical plug array 135 comprises standard electrical plugs, each preferably rated at 20 amps, tamper resistant, and GFCI (Ground-Fault Circuit Interrupter) protected, or the like. The first phase electrical plug array 138 comprises one or more electrical plugs 137 for a first phase, or the like. The second phase electrical plug array 138 comprises one or more electrical plugs 137 for a second phase, or the like. The one or more electrical plugs 137 comprises standard electrical plugs, each preferably rated at 20 amps, tamper resistant, and GFCI (Ground-Fault Circuit Interrupter) protected, or the like. The one or more electrical plugs 137 may also be color coded, or the like, to differentiate between phases. The materials listed herein are examples only and not intended to limit the scope of the present invention.

Figure 9:
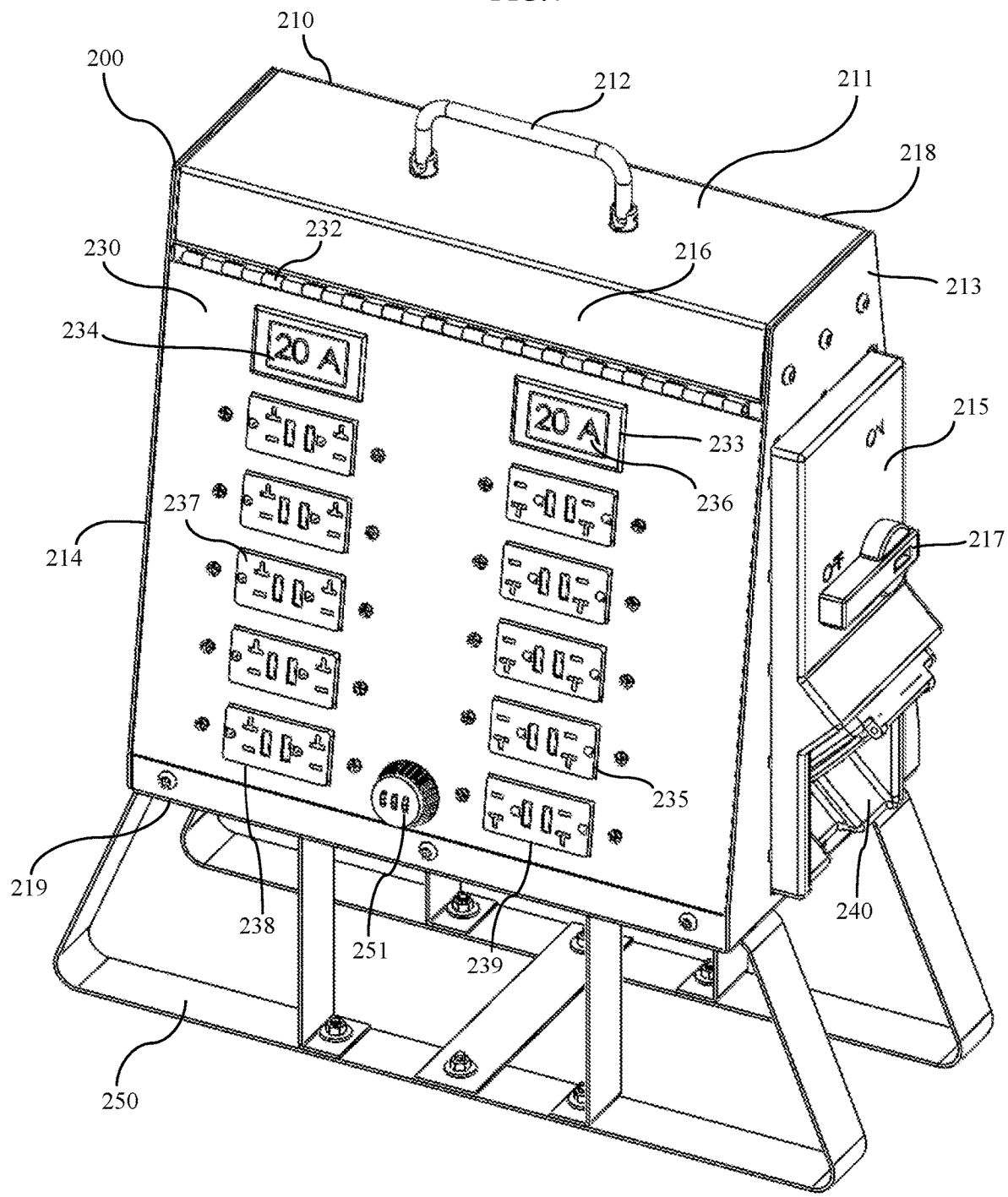
FIG. 9 is a front perspective view of another preferred embodiment of an apparatus of the present invention.
Figure 10:
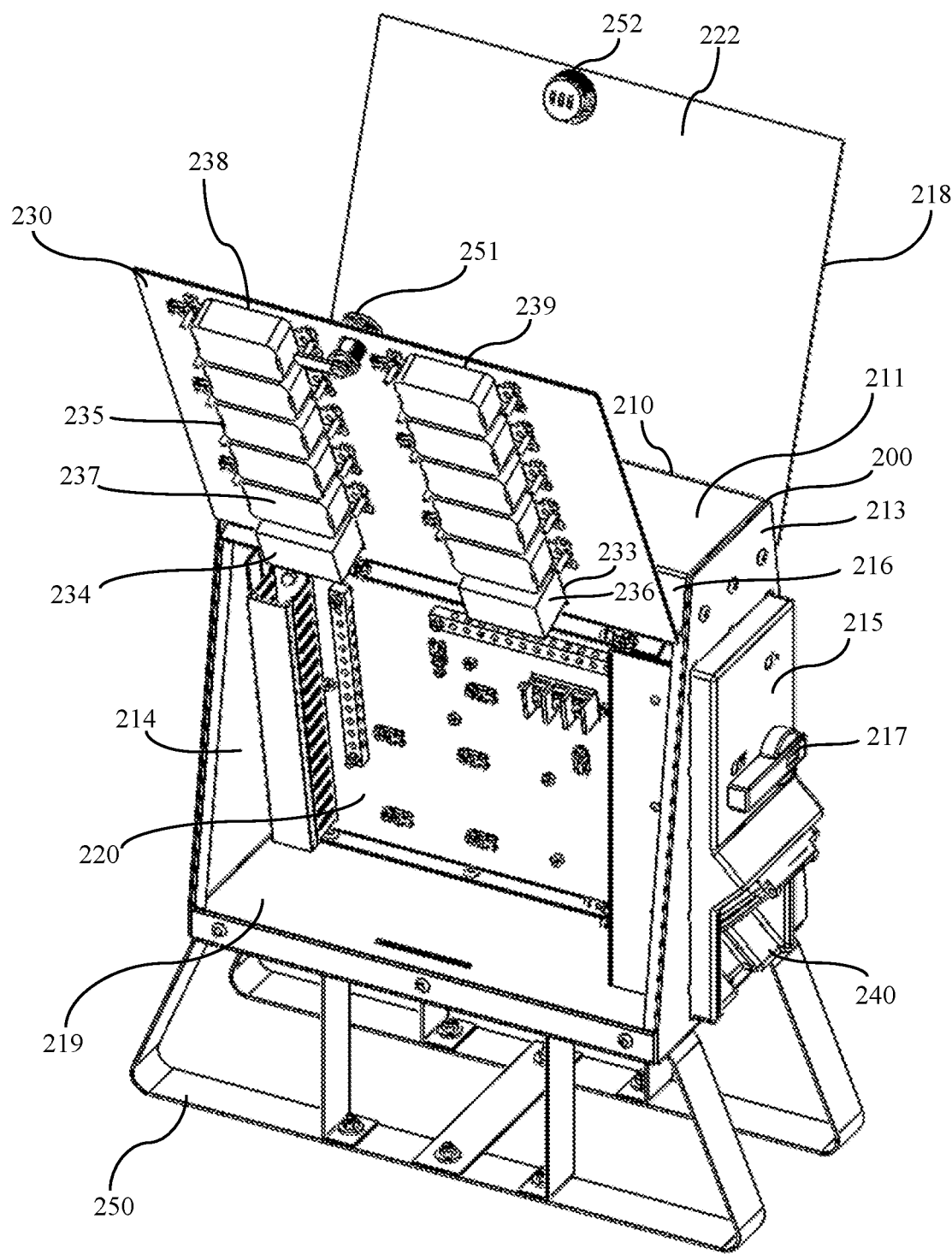
FIG. 10 is a front perspective view of an apparatus of FIG. 9.
Figure 11:
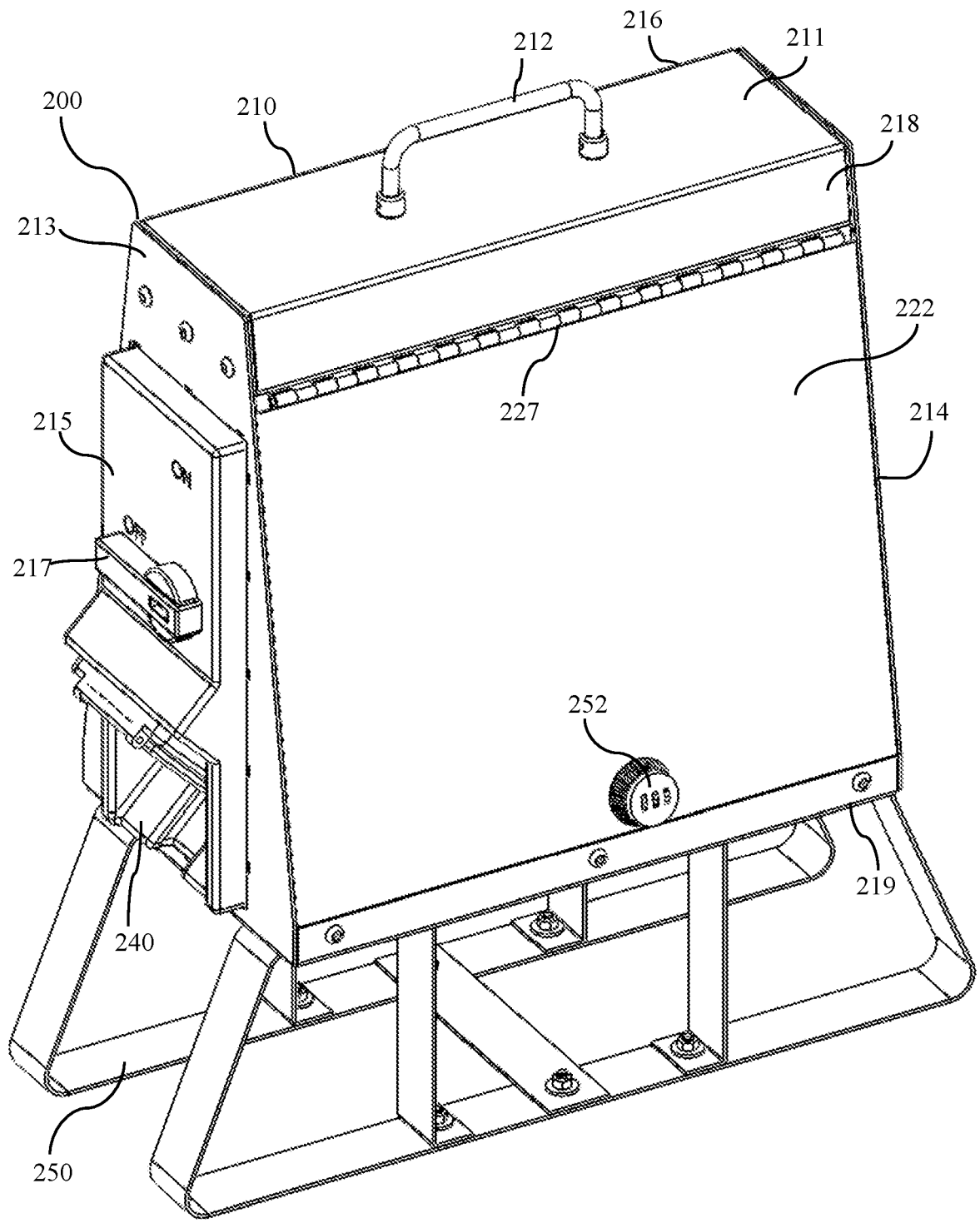
FIG. 11 is a rear perspective view of an apparatus of FIG. 9.
Figure 12:
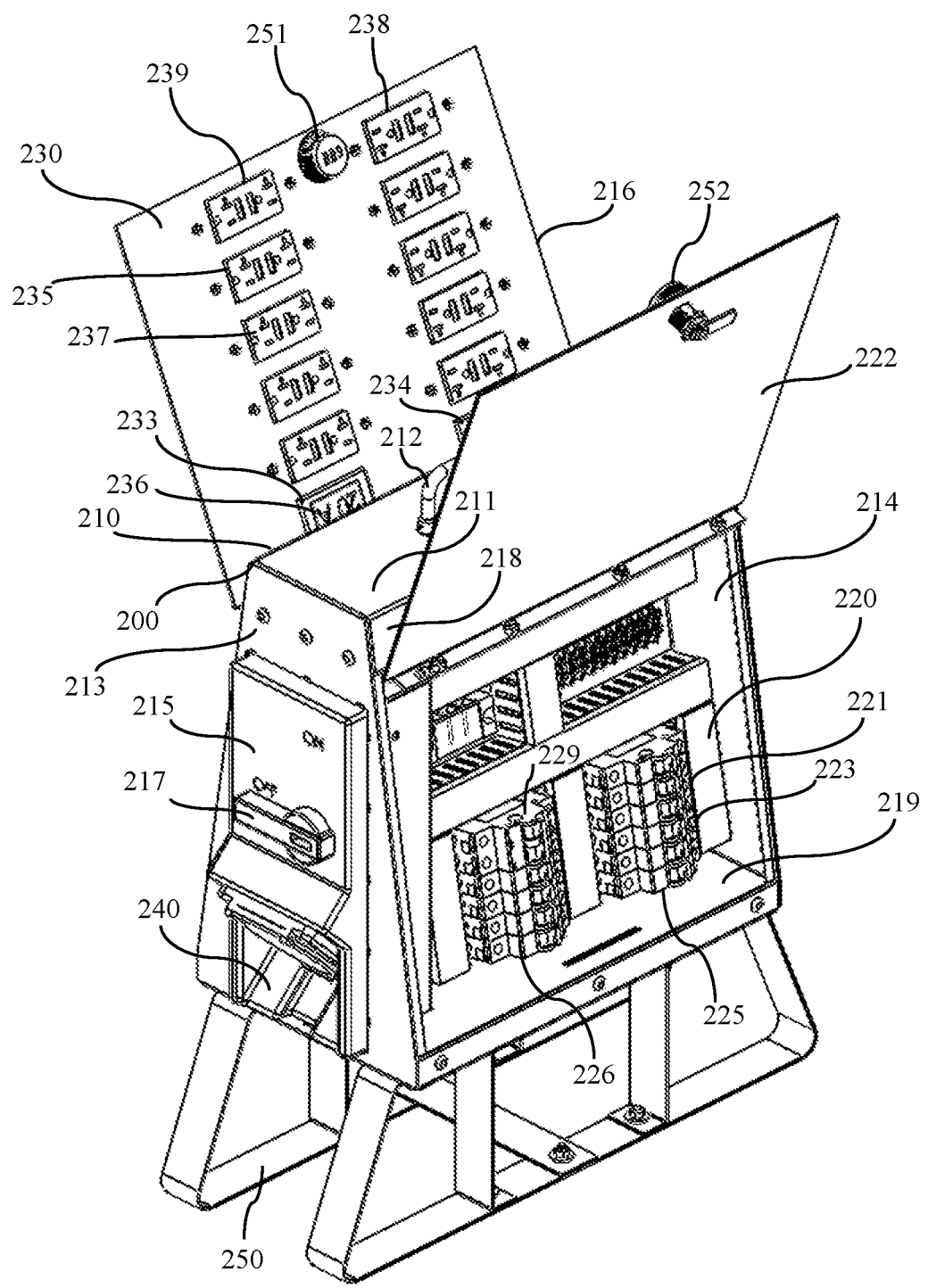
FIG. 12 is a rear perspective view of an apparatus of FIG. 9.
Figure 13:
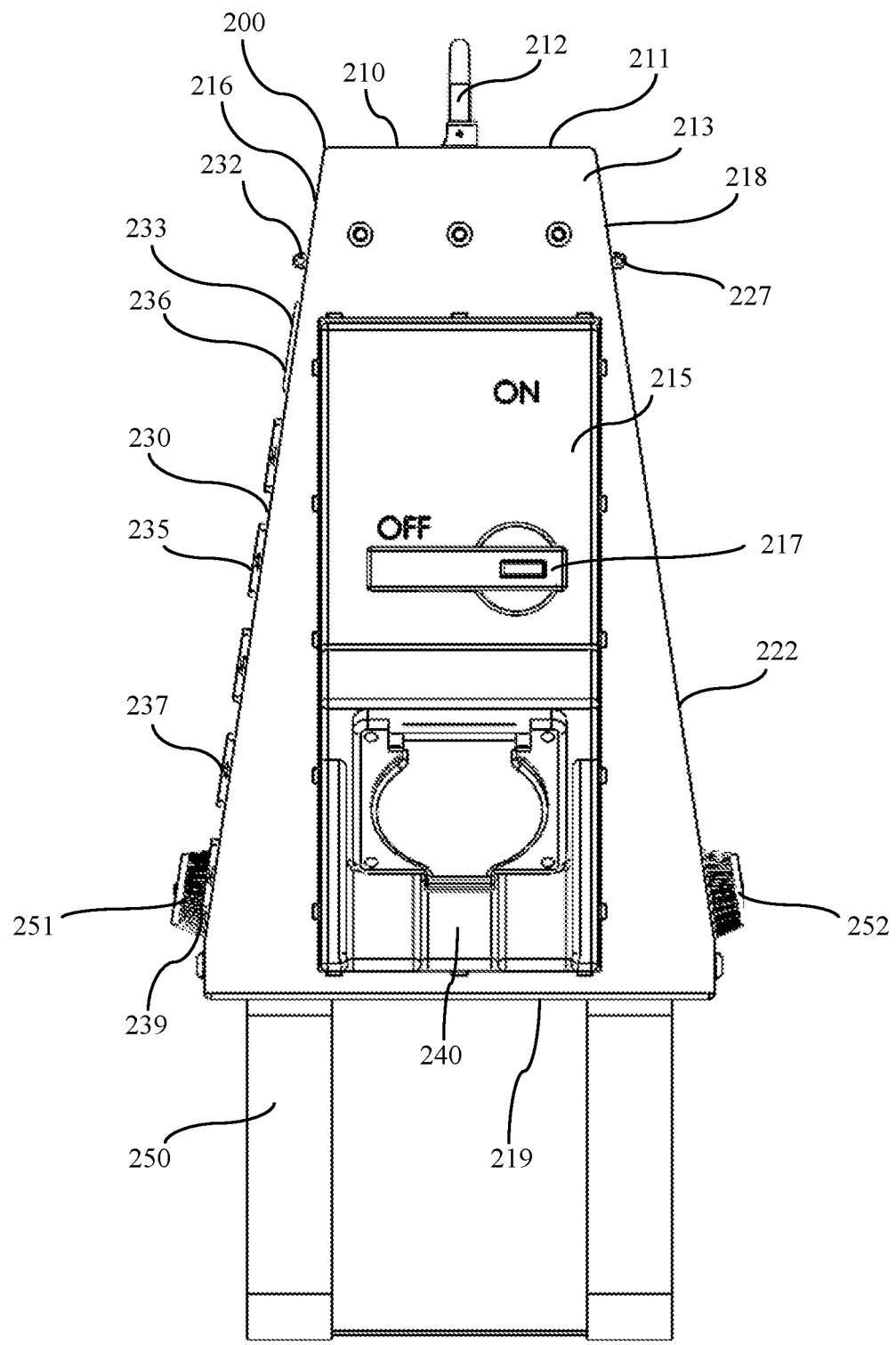
FIG. 13 is a right side view of an apparatus of FIG. 9.
Figure 14:
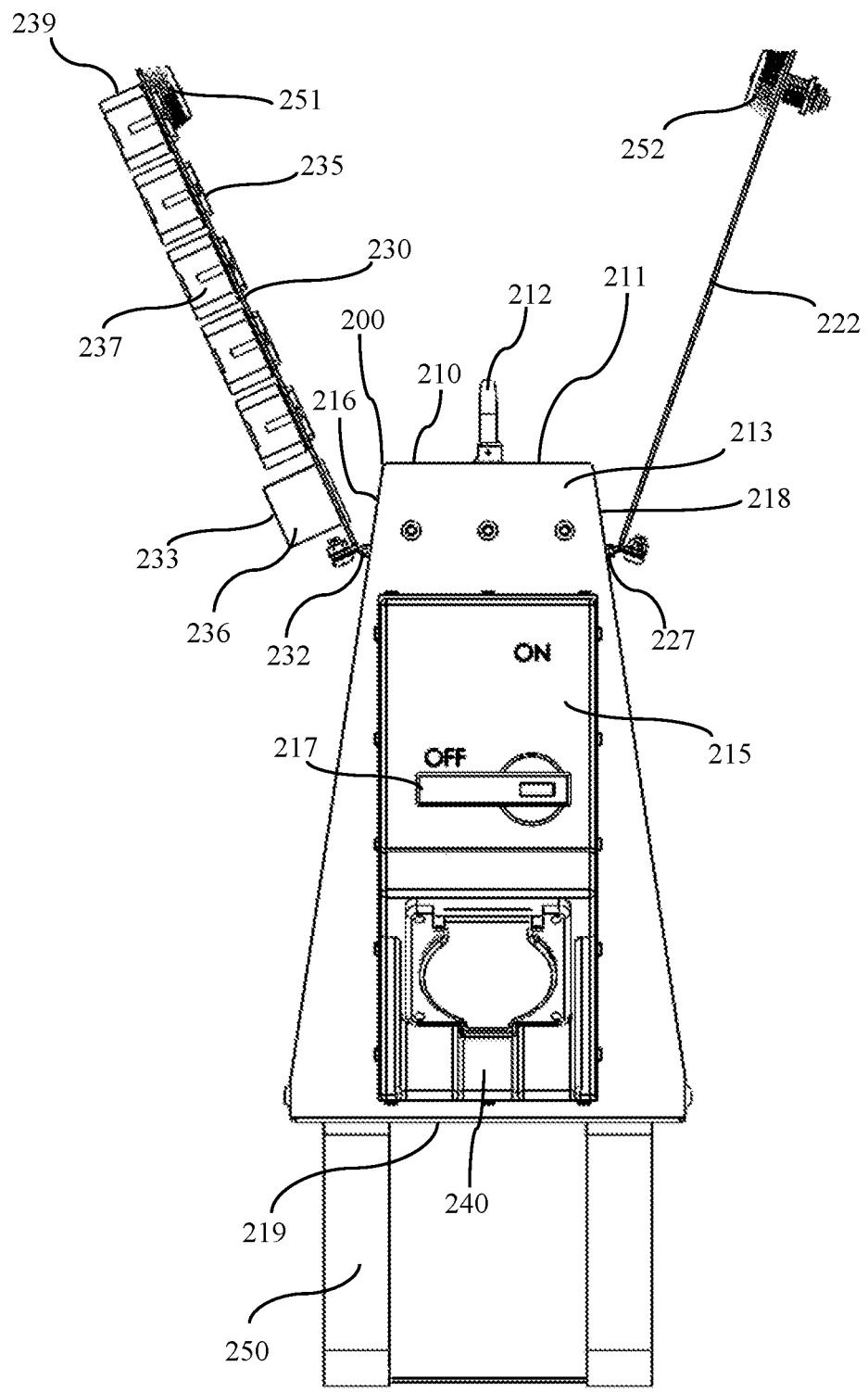
FIG. 14 is a right side view of an apparatus of FIG. 9.
Figure 15:
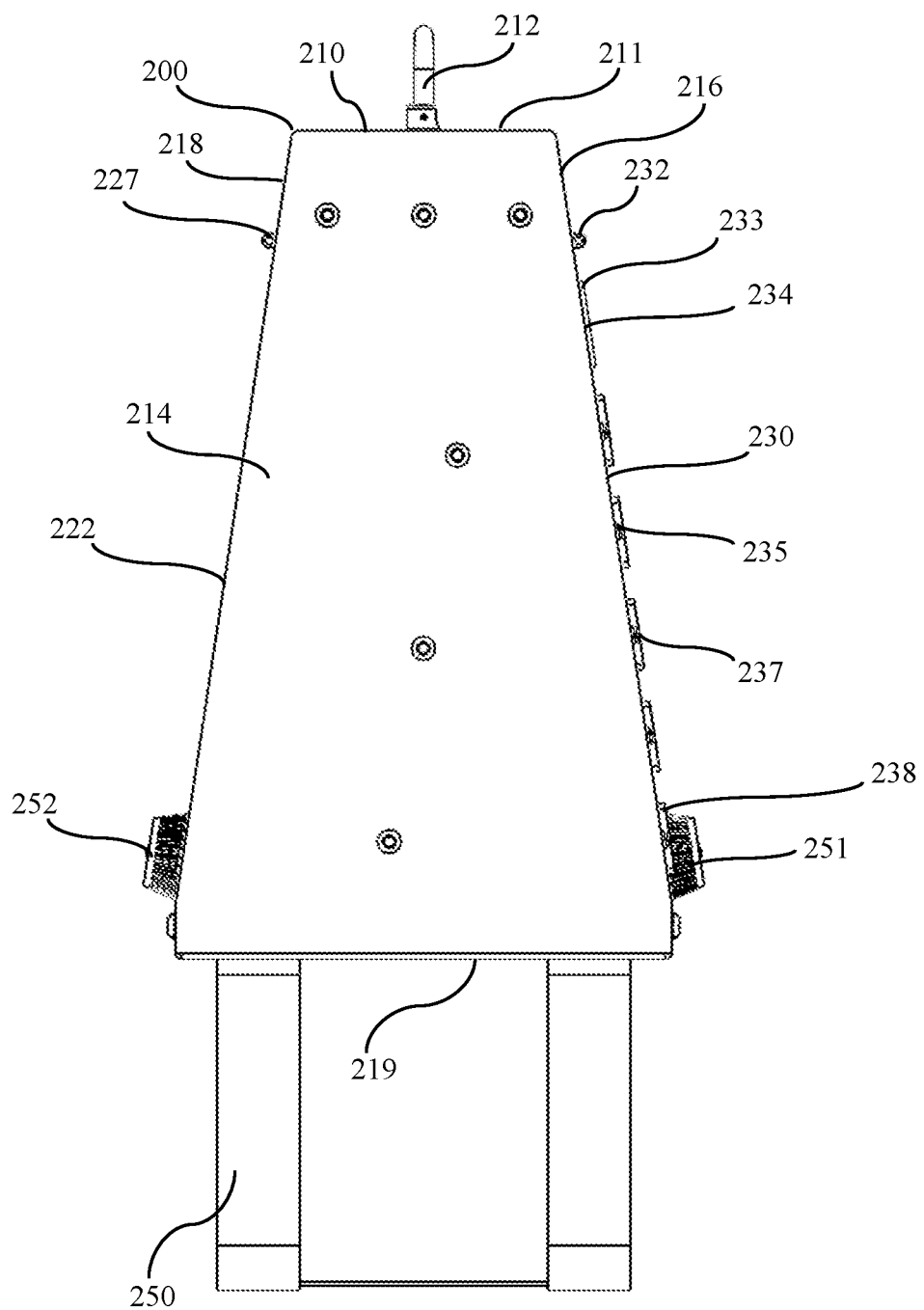
FIG. 15 is a left side view of an apparatus of FIG. 9.
Figure 16:
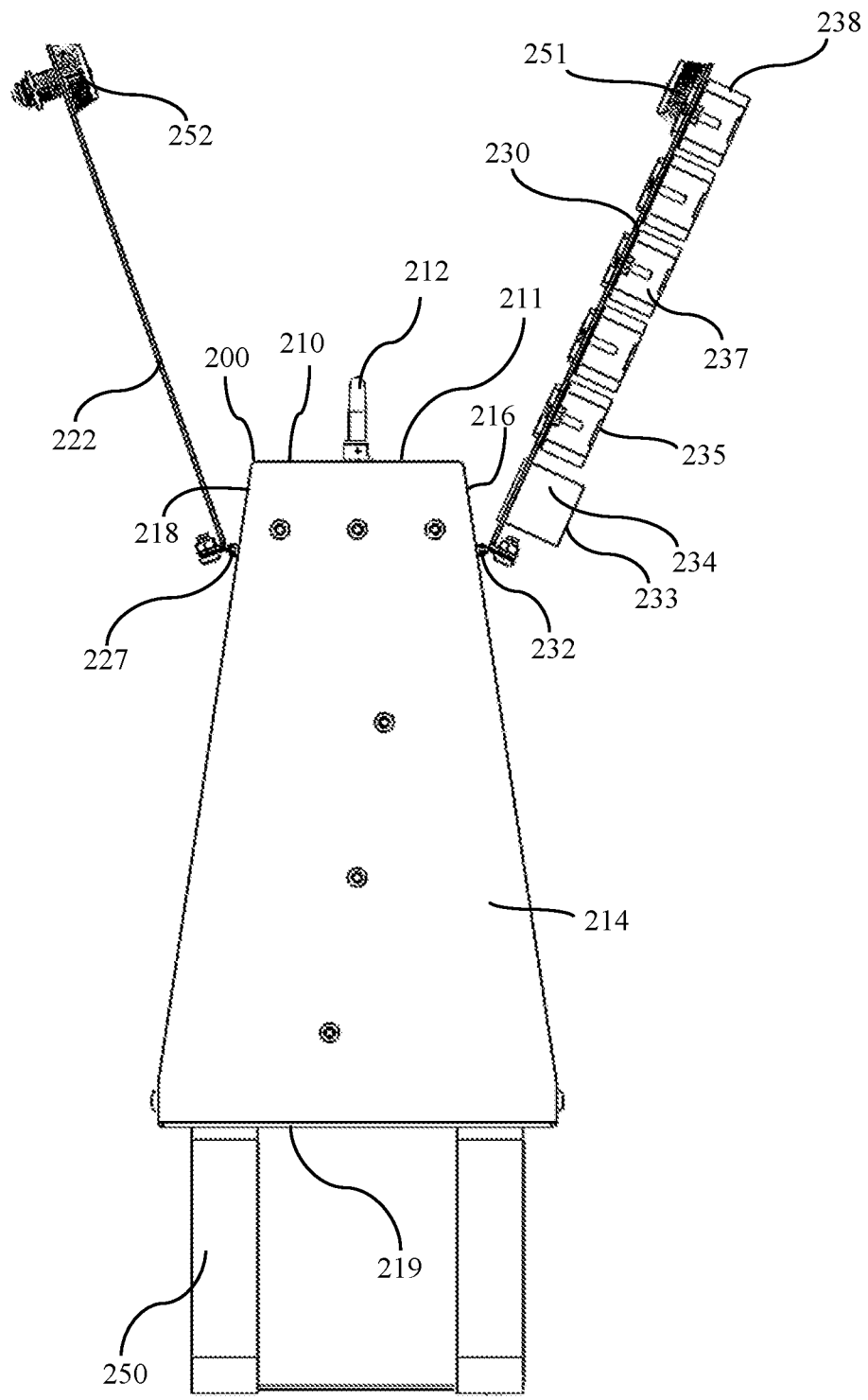
FIG. 16 is a left side view of an apparatus of FIG. 9.
Figure 17:
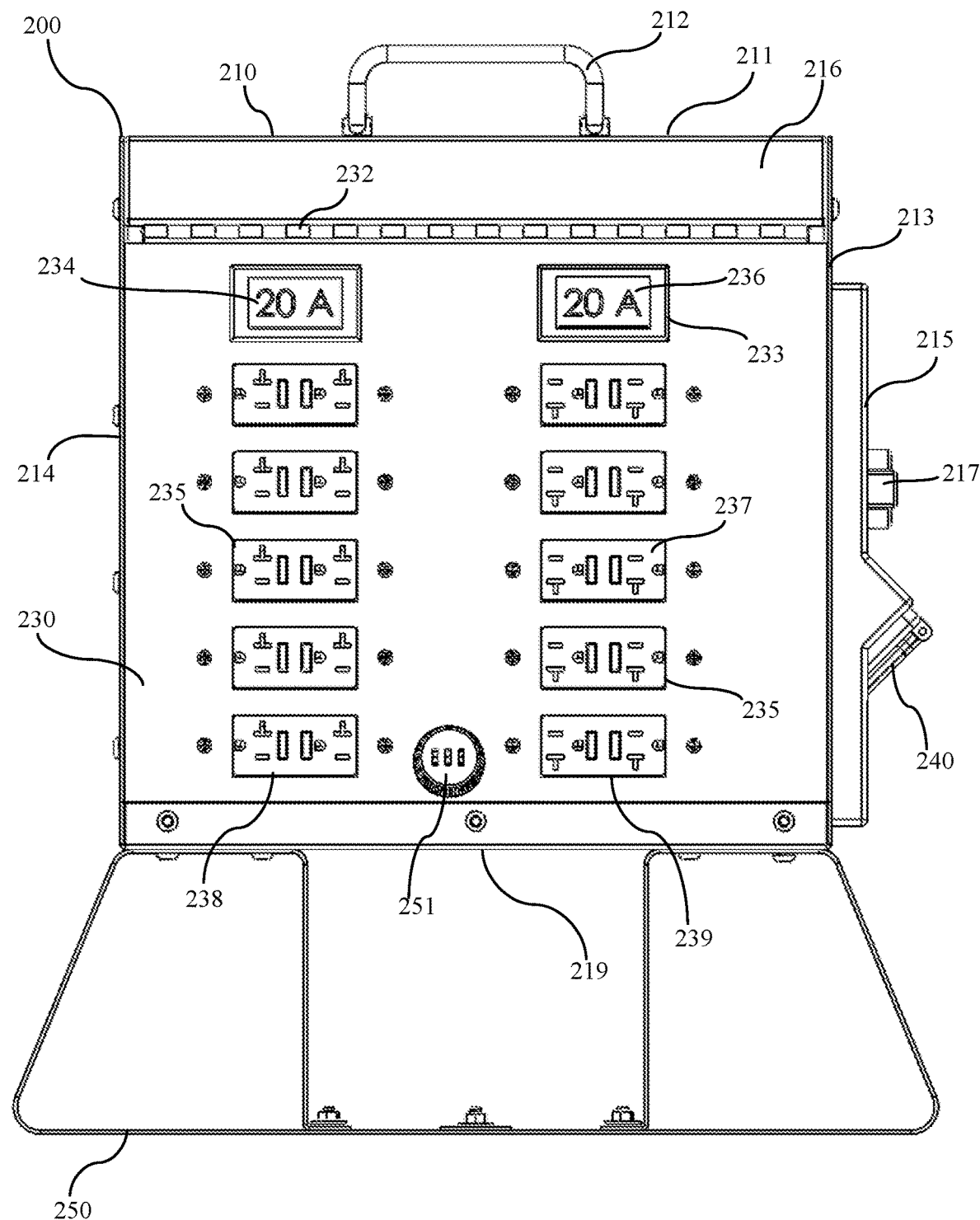
FIG. 17 is a front view of an apparatus of FIG. 9.
Figure 18:
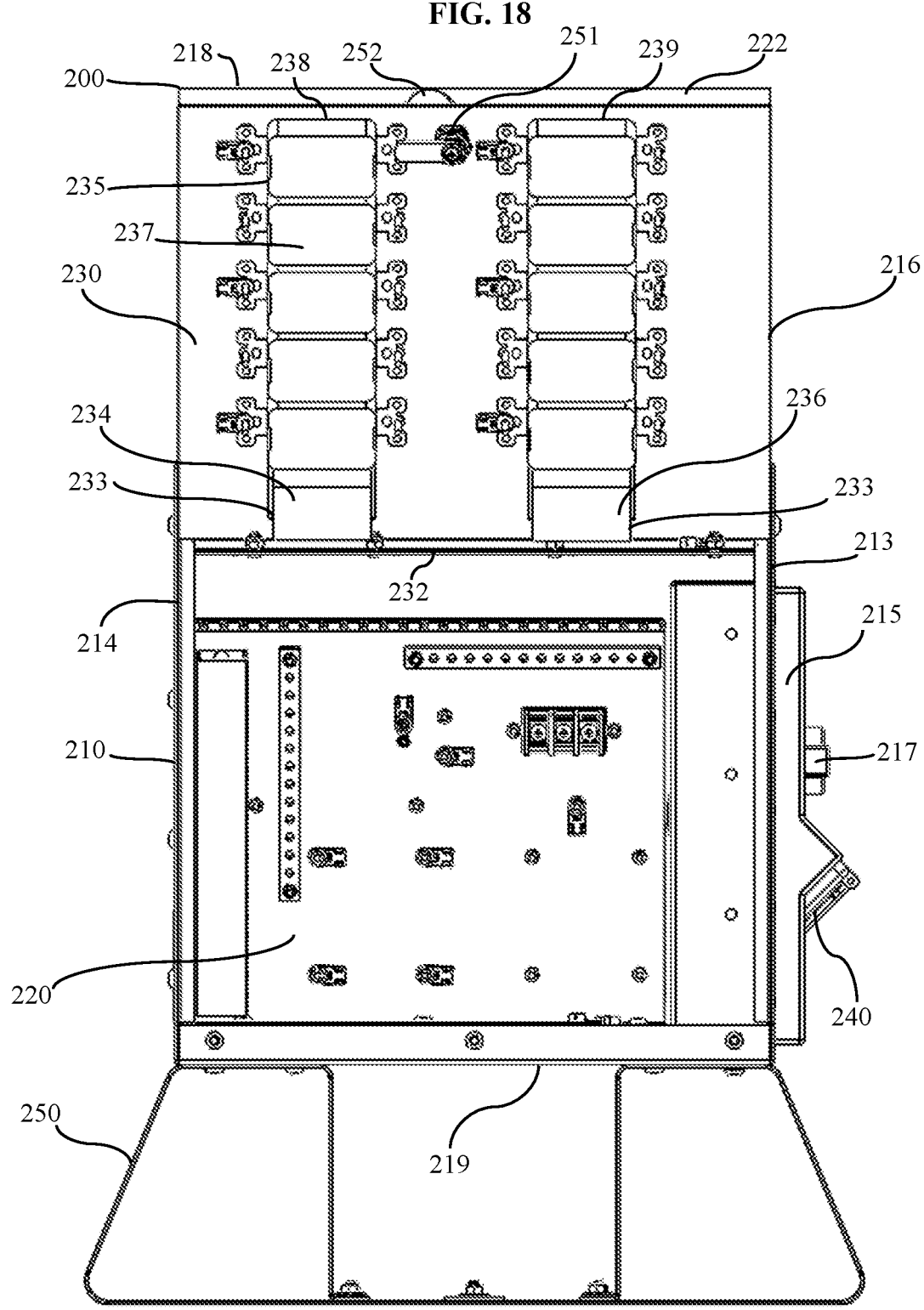
FIG. 18 is a front view of an apparatus of FIG. 9.
Figure 19:
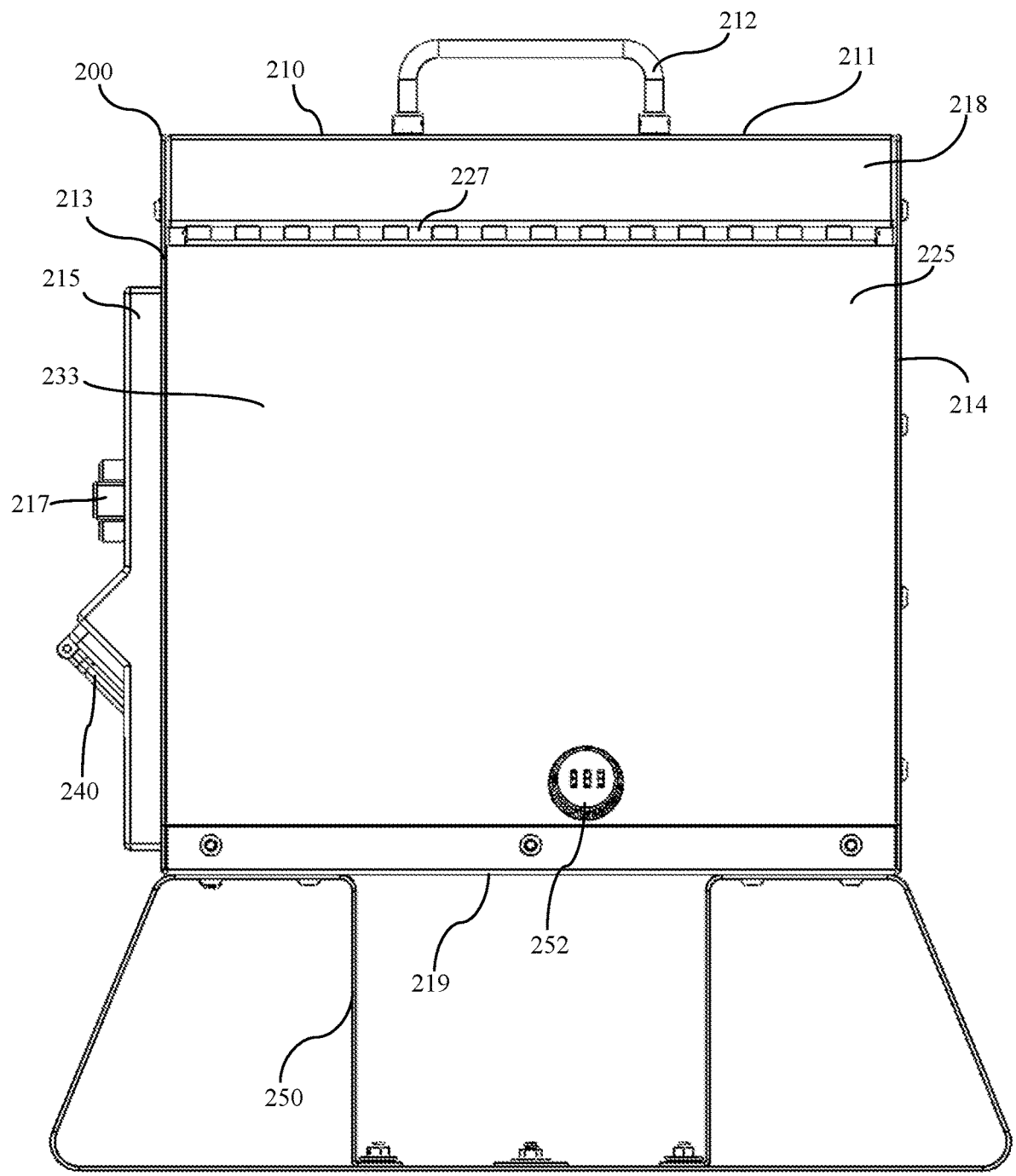
FIG. 19 is a rear view of an apparatus of FIG. 9.
Figure 20:
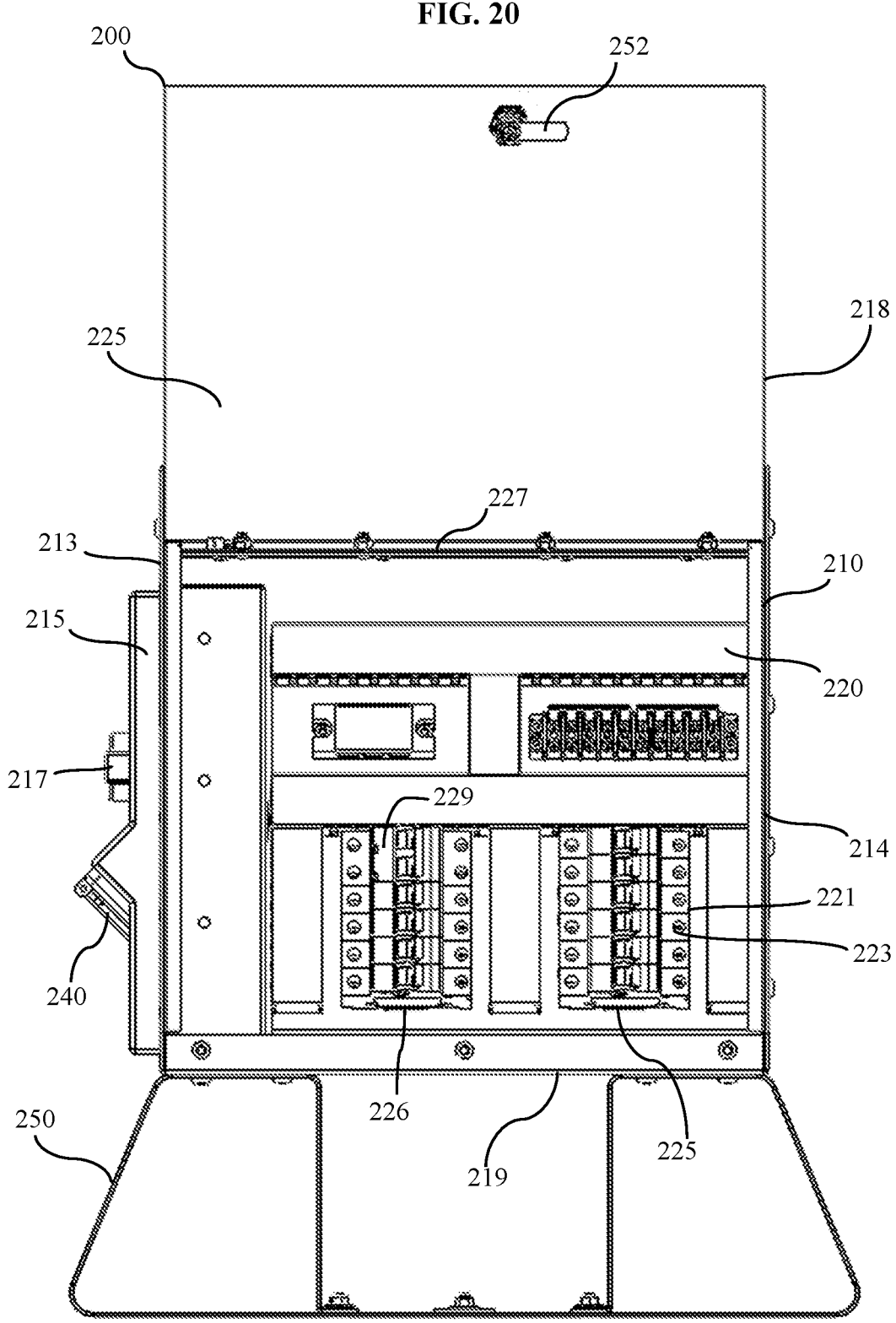
FIG. 20 is a rear view of an apparatus of FIG. 9.

Referring now to another preferred embodiment of the present invention, in FIG. 9, FIG. 10, FIG. 11, FIG. 12, FIG. 13, FIG. 14, FIG. 15, FIG. 16, FIG. 17, FIG. 18, FIG. 19, and FIG. 20, a Free Standing Temporary Electrical Panel 200 is shown. FIG. 9 shows a front perspective view of a Free Standing Temporary Electrical Panel 200. FIG. 10 displays a front perspective view of Free Standing Temporary Electrical Panel 200 with the electrical plug panel 230 and the rear panel door 222 open. FIG. 11 depicts a rear perspective view of a Free Standing Temporary Electrical Panel 200. FIG. 12 shows a rear perspective view of a Free Standing Temporary Electrical Panel 200 with the electrical plug panel 230 and the rear panel door 222 open. FIG. 13 illustrates a right side view of a Free Standing Temporary Electrical Panel 200. FIG. 14 depicts a right side view of a Free Standing Temporary Electrical Panel 200 with the electrical plug panel 230 and the rear panel door 222 open. FIG. 15 shows a left side view of a Free Standing Temporary Electrical Panel 200. FIG. 16 demonstrates a left side view of a Free Standing Temporary Electrical Panel 200 with the electrical plug panel 230 and the rear panel door 222 open. FIG. 17 depicts a front view of a Free Standing Temporary Electrical Panel 200. FIG. 18 displays a front view of a Free Standing Temporary Electrical Panel 200 with the electrical plug panel 230 and the rear panel door 222 open. FIG. 19 illustrates a rear view of a Free Standing Temporary Electrical Panel 200. FIG. 20 illustrates a rear view of a Free Standing Temporary Electrical Panel 200 with the electrical plug panel 230 and the rear panel door 222 open.

Referring still to the preferred embodiment of the invention in FIG. 9, FIG. 10, FIG. 11, FIG. 12, FIG. 13, FIG. 14, FIG. 15, FIG. 16, FIG. 17, FIG. 18, FIG. 19, and FIG. 20, the Free Standing Temporary Electrical Panel 200 is a portable apparatus for providing and monitoring a temporary electrical supply, which comprises an outer cover 210, support skids 250, and a breaker compartment 220. The outer cover 210 comprises a top panel 211, a front panel 216, a rear panel 218, a right-side panel 213, a left-side panel 214, and a bottom panel 219. The top panel 211 comprises one or more free standing handles 212, which are capable of supporting the Free Standing Temporary Electrical Panel 200 while it is being transported. The front panel 216 comprises a front panel hinge 232 and an electrical plug panel 230. The electrical plug panel 230 depends from the front panel hinge 232 and is capable of opening. The electrical plug panel 230 comprises a front latch 251, a free standing meter array 233, and a free standing electrical plug array 235. The free standing meter array 233 comprises one or more free standing amp meters 234, which are capable of detecting current information, and one or more free standing voltage meters 236, which are capable of detecting voltage information. Additionally, the one or more free standing amp meters 234 and the one or more free standing voltage meters 236 may be combined into one or more single computerized units with a display, which measures both current and voltage for each electrical plug and/or phase and displays the information at the user's option. The free standing electrical plug array 235 comprises a free standing first phase electrical plug array 238, a free standing second phase electrical plug array 239, and one or more free standing electrical plugs 237, with each of the free standing electrical plugs 237 having one dedicated breaker 223 and being capable of being monitored by the free standing amp meters 234 and the free standing voltage meters 236. The free standing first phase electrical plug array 238 and the free standing second phase electrical plug array 239 each provide electrical power at different phases. The rear panel 218 comprises a rear panel hinge 227, and a rear panel door 222. The rear panel door 222 depends from the rear panel hinge 227 and is capable of opening. The rear panel door 222 comprises a rear latch 252. The right-side panel 213 comprises a free standing power supply receiver 240 and a power switch panel 215. The power switch panel 215 comprises a power switch 217. The support skids 250 depend from the bottom panel 219 of the outer cover 210 and support the Free Standing Temporary Electrical Panel 200 in place in a temporary location. The breaker compartment 220 is disposed behind the rear panel door 222 and comprises a free standing circuit breaker array 221. The free standing circuit breaker array 221 comprises a free standing main breaker 229, a free standing first phase circuit breaker array 225, a free standing second phase circuit breaker array 226, and one or more free standing dedicated breakers 223, with each one or more free standing dedicated breakers 223 being for one free standing electrical plug 237. The free standing first phase circuit breaker array 225 and the free standing second phase circuit breaker array 226 each handle electrical power at different phases. During use, Free Standing Temporary Electrical Panel 200 is moved to a location requiring temporary power using the free standing handles 212, and temporary electrical power is supplied to the free standing power supply receiver 240, then to the main breaker 229 of the free standing circuit breaker array 221, through one or more free standing dedicated breakers 223, and out of one or more free standing electrical plugs 237, wherein the temporary electrical power for each free standing electrical plugs 237 is monitored by the one or more free standing amp meters 234 and the one or more free standing voltage meters 236.

The construction details of the invention as shown in FIG. 9, FIG. 10, FIG. 11, FIG. 12, FIG. 13, FIG. 14, FIG. 15, FIG. 16, FIG. 17, FIG. 18, FIG. 19, and FIG. 20, are as follows. The outer cover 210 of the Free Standing Temporary Electrical Panel 200 comprises a strong, rigid, and lightweight material, such as plastic, wood, fiberglass, fiberboard, composite material, metal, steel, aluminum, metal alloy, or the like. The top panel 211 comprises a strong, rigid, and lightweight material, such as plastic, wood, fiberglass, fiberboard, composite material, metal, steel, aluminum, metal alloy, or the like. The one or more free standing handles 212 comprise a strong, rigid material capable of supporting the weight of the Free Standing Temporary Electrical Panel 200 when lifted, such as metal, steel, aluminum, metal alloy, plastic, fiberglass, ceramic, composite material, or the like. The front panel 216 comprises a strong, rigid, and lightweight material, such as plastic, wood, fiberglass, fiberboard, composite material, metal, steel, aluminum, metal alloy, or the like. The front panel hinge 232 comprises a strong and rigid material, such as plastic, fiberglass, composite material, metal, steel, aluminum, metal alloy, or the like. The front latch 251 comprises a standard latch, which is capable of holding the front panel 216 shut. The rear panel 218 comprises a strong, rigid, and lightweight material, such as plastic, wood, fiberglass, fiberboard, composite material, metal, steel, aluminum, metal alloy, or the like. The rear panel hinge 227 comprises a strong and rigid material, such as plastic, fiberglass, composite material, metal, steel, aluminum, metal alloy, or the like. The rear latch 252 comprises a standard latch, which is capable of holding the rear panel 218 shut. The right-side panel 213 comprises a strong, rigid, and lightweight material, such as plastic, wood, fiberglass, fiberboard, composite material, metal, steel, aluminum, metal alloy, or the like. The power switch panel 215 comprises a strong, rigid, and lightweight material, such as plastic, wood, fiberglass, fiberboard, composite material, metal, steel, aluminum, metal alloy, or the like. The power switch 217 comprises a standard electrical switch, which is capable of turning electrical power to the Free Standing Temporary Electrical Panel 200 on or off. The left-side panel 214 comprises a strong, rigid, and lightweight material, such as plastic, wood, fiberglass, fiberboard, composite material, metal, steel, aluminum, metal alloy, or the like. The bottom panel 219 comprises a strong, rigid, and lightweight material, such as plastic, wood, fiberglass, fiberboard, composite material, metal, steel, aluminum, metal alloy, or the like. The support skids 250 comprise a strong rigid material capable of supporting the weight of the Free Standing Temporary Electrical Panel 200, such as plastic, wood, fiberglass, fiberboard, composite material, metal, steel, aluminum, metal alloy, or the like. The free standing power supply receiver 240 comprises a 50 amp plug or the like. The electrical plug panel 230 comprises metal, steel, aluminum, metal alloy, wood, plastic, fiberglass, ceramic, composite material, or the like. The rear panel door 222 comprises metal, steel, aluminum, metal alloy, plastic, fiberglass, ceramic, composite material, or the like. The breaker compartment 220 is the compartment behind the rear panel door 222. The free standing circuit breaker array 221 comprises one or more free standing main breakers 229 and one or more free standing dedicated breakers 223 for one or more phases, or the like. The free standing main breakers 229 comprises a standard breaker, preferably with a minimum rating of 40 amps, or the like. The free standing main breakers 229 comprises one or more free standing dedicated breakers 223 for a first phase, or the like. The free standing second phase circuit breaker array 226 comprises one or more free standing dedicated breakers 223 for a second phase, or the like. The one or more free standing dedicated breakers 223 comprises standard breakers, preferably with a minimum rating of 20 amps, or the like. The free standing meter array 233 comprises standard amp meters, which are capable of measuring current, and standard voltage meters, which are capable of measuring voltage, or combined amp-voltage meters, which are capable of measuring both current and voltage, or the like. The one or more free standing amp meters 234 comprise standard amp meters, which measure electrical current, or combined amp-voltage meters, which measure both electrical current and voltage, or the like. The one or more free standing voltage meters 236 comprise standard voltage meters, which are capable of measuring electrical voltage, or combined amp-voltage meters, which are capable of measuring both current and voltage, or the like. Additionally, the one or more free standing amp meters 234 and the one or more free standing voltage meters 236 may be combined into a single computerized unit with a display, which measures both current and voltage for each free standing electrical plug 237 and/or phase and displays the information at the user's option. The free standing electrical plug array 235 comprises standard electrical plugs, each preferably rated at 20 amps, tamper resistant, and GFCI (Ground-Fault Circuit Interrupter) protected, or the like. The free standing first phase electrical plug array 238 comprises one or more free standing electrical plugs 237 for a first phase, or the like. The free standing second phase electrical plug array 239 comprises one or more free standing electrical plugs 237 for a second phase, or the like. The one or more free standing electrical plugs 237 comprises standard electrical plugs, each preferably rated at 20 amps, tamper resistant, and GFCI (Ground-Fault Circuit Interrupter) protected, or the like. The one or more free standing electrical plugs 237 may also be color coded, or the like, to differentiate between phases. The materials listed herein are examples only and not intended to limit the scope of the present invention.

The advantages of the present invention include, without limitation, that it provides a portable means of supplying temporary electrical power, which is monitored. Further, the Temporary Electrical Panel invention provides a strong and lightweight apparatus with a means for lifting into order to provide superior portability to a temporary location. Additionally, the Temporary Electrical Panel invention provides temporary power to a remote location without a primary power source. The Temporary Electrical Panel invention also provides temporary power at different phases. Moreover, the Temporary Electrical Panel invention monitors current and voltage of supplied temporary power in order to prevent insufficient power, fires, electrical shock, damaged equipment, or other detrimental outcomes. In sum, the Temporary Electrical Panel invention provides a safe and convenient means of supplying a portable monitored temporary electrical power source.

In broad embodiment, the present invention relates generally to an apparatus, which provides a portable temporary electrical supply with an array of circuit breakers, and an array of electrical plugs with built-in voltage and amp meters for monitoring the corresponding phase.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods that are within the scope and spirit of the invention as claimed.

What is claimed is:

1. A portable apparatus for providing and monitoring temporary electrical power, said portable apparatus comprising:
　a first power leg, said first power leg being capable of receiving a first power portion of said temporary electrical power, said first power leg comprising:
　　a plurality of first branches, said first branches being arranged electrically in parallel with of each other;
　a second power leg, said second power leg being capable of receiving a second power portion of said temporary electrical power, said second power leg comprising:
　　a plurality of second branches, said second branches being arranged electrically in parallel with each other;
　a back board, said back board comprising
　　one or more handles, said one or more handles being capable of supporting said portable apparatus;
　a breaker box, said breaker box being mounted on said back board, said breaker box comprising:
　　a circuit breaker array, said circuit breaker array comprising:
　　　a main breaker, said main breaker comprising:
　　　　a first interruptible path, said first interruptible path being capable of receiving and interrupting said first power portion of said temporary electrical power, and
　　　　a second interruptible path, said second interruptible path being capable of receiving and interrupting said second power portion of said temporary electrical power,
　　　a plurality of first leg dedicated branch breakers, said first leg dedicated branch breakers being capable of receiving said first power portion from said first interruptible path of said main breaker and arranged electrically in parallel with each other, each of said first leg dedicated branch breakers being capable of independently interrupting said first power portion of said temporary electrical power flowing through a corresponding one of said first branches of said first power leg, and
　　　a plurality of second leg dedicated branch breakers, said second leg dedicated branch breakers being capable of receiving said second power portion from said second interruptible path of said main breaker and arranged electrically in parallel with each other, each of said second leg dedicated branch breakers being capable of independently interrupting said second power portion of said temporary electrical power flowing through a corresponding one of said second branches of said second power leg, and;
　　a breaker box door, said breaker box door being capable of covering said circuit breaker array when closed;
　a power supply receiver, said power supply receiver being connected to said breaker box through a power supply conduit;
　an outlet box, said outlet box being mounted to said back board and electrically connected to said breaker box, said outlet box comprising:
　　an electrical plug array, said electrical plug array comprising:
　　　a plurality of first leg electrical plugs, each of said first leg electrical plugs being electrically connected to a respective one of said first leg dedicated branch breakers forming first leg breaker-plug pairs, and
　　　a plurality of second leg electrical plugs, each of said second leg electrical plugs being electrically connected to a respective one of said second leg dedicated branch breakers forming second leg breaker-plug pairs; and
　　a meter array, said meter array comprising:
　　　a first leg amp meter, said first leg amp meter being capable of detecting current information flowing through said first power portion from said first interruptible path of said main breaker,
　　　a second leg amp meter, said second leg amp meter being capable of detecting current information flowing through said second power portion from said second interruptible path of said main breaker,
　　　a first leg voltage meter, said first leg voltage meter being capable of detecting voltage information of said first power leg, and
　　　a said second leg voltage meter, said second leg voltage meter being capable of detecting voltage information of said second power leg;
　wherein said first power portion of said temporary electrical power is supplied through said power supply receiver, through said first interruptible path of said main breaker, and to each of said first leg breaker-plug pairs;

wherein said second power portion of said temporary electrical power is supplied through said power supply receiver, through said second interruptible path of said main breaker, and to each of said second leg breaker-plug pairs;

wherein said temporary electrical power flowing through said first power leg is monitored by said first leg amp meter and said first leg voltage meter, said first leg amp meter being capable of outputting said current information flowing through said first power portion from said first interruptible path of said main breaker, and said first leg voltage meter being capable of outputting said voltage information across said first power leg; and wherein said temporary electrical power flowing through said second power leg is monitored by said second leg amp meter and said second leg voltage meter, said second leg amp meter being capable of outputting current information flowing through said second power portion from said second interruptible path of said main breaker, and said second leg voltage meter being capable of outputting said voltage information across said second power leg.

2. The portable apparatus of claim 1, wherein said first leg amp meter, said second leg amp meter, said first leg voltage meter, and said second leg voltage meter are combined into a single computerized unit with a display.

3. The portable apparatus of claim 1, wherein said first leg electrical plugs are color coded differently than said second leg electrical plugs.

4. The portable apparatus of claim 1, wherein said first leg electrical plugs and said second leg electrical plugs are tamper resistant.

5. The portable apparatus of claim 1, wherein said first leg electrical plugs and said second leg electrical plugs are ground-fault circuit interrupter (GFCI) protected.

6. The portable apparatus of claim 1, wherein said first leg amp meter and said first leg voltage meter are a combined first leg amp-voltage meter, and wherein said second leg amp meter and said second leg voltage meter are a combined second leg amp-voltage meter.

7. A portable apparatus for providing and monitoring temporary electrical power, said portable apparatus comprising:
- a first power leg, said first power leg being capable of receiving a first power portion of said temporary electrical power, said first power leg comprising:
  - a plurality of first branches, said first branches being arranged electrically in parallel with of each other;
- a second power leg, said second power leg being capable of receiving a second power portion of said temporary electrical power, said second power leg comprising:
  - a plurality of second branches, said second branches being arranged electrically in parallel with each other;
- a breaker compartment, said breaker compartment comprising:
  - a circuit breaker array, said circuit breaker array comprising:
    - a main breaker, said main breaker comprising:
      - a first interruptible path, said first interruptible path being capable of receiving and interrupting said first power portion of said temporary electrical power, and
      - a second interruptible path, said second interruptible path being capable of receiving and interrupting said second power portion of said temporary electrical power,
    - a plurality of first leg dedicated branch breakers, said first leg dedicated branch breakers being capable of receiving said first power portion from said first interruptible path of said main breaker and arranged electrically in parallel with each other, each of said first leg dedicated branch breakers being capable of independently interrupting said first power portion of said temporary electrical power flowing through a corresponding one of said first branches of said first power leg, and
    - a plurality of second leg dedicated branch breakers, said second leg dedicated branch breakers being capable of receiving said second power portion from said second interruptible path of said main breaker and arranged electrically in parallel with each other, each of said second leg dedicated branch breakers being capable of independently interrupting said second power portion of said temporary electrical power flowing through a corresponding one of said second branches of said second power leg;
- an outer cover, said outer cover comprising
  - a top panel, said top panel comprising:
    - one or more handles, said one or more handles being capable of supporting said portable apparatus;
  - a front panel, said front panel comprising:
    - a front panel hinge, and
    - an electrical plug panel, said electrical plug panel depending from said front panel hinge and being capable of opening, said electrical plug panel comprising:
      - a front latch,
      - an electrical plug array, said electrical plug array comprising:
        - a plurality of first leg electrical plugs, each of said first leg electrical plugs being electrically connected to a respective one of said first leg dedicated branch breakers forming first leg breaker-plug pairs, and
        - a plurality of second leg electrical plugs, each of said second leg electrical plugs being electrically connected to a respective one of said second leg dedicated branch breakers forming second leg breaker-plug pairs, and
      - a meter array, said meter array comprising:
        - a first leg amp meter, said first leg amp meter being capable of detecting current information flowing through said first power portion from said first interruptible path of said main breaker,
        - a second leg amp meter, said second leg amp meter being capable of detecting current information flowing through said second power portion from said second interruptible path of said main breaker,
        - a first leg voltage meter, said first leg voltage meter being capable of detecting voltage information of said first power leg, and
        - said second leg voltage meter, said second leg voltage meter being capable of detecting voltage information of said second power leg; and
  - a rear panel, said rear panel comprising:
    - a rear panel hinge, and a rear panel door, said rear panel door depending from said rear panel hinge and being capable of covering said breaker compartment when closed, said rear panel door comprising:
   a rear latch;
a right-side panel, said right-side panel comprising:
   a power supply receiver, and
   a power switch panel, said power switch panel comprising:
     a power switch;
a left-side panel; and
a bottom panel; and
support skids, said support skids depending from said bottom panel of said outer cover;
wherein said first portion of said temporary electrical power is supplied through said power supply receiver, through said first power portion from said first interruptible path of said main breaker, and to each of said first leg breaker-plug pairs;
wherein said second power portion of said temporary electrical power is supplied through said power supply receiver, through said second power portion from said second interruptible path of said main breaker, and to each of said second leg breaker-plug pairs;
wherein said temporary electrical power flowing through said first power leg is monitored by said first leg amp meter and said first leg voltage meter, said first leg amp meter being capable of outputting current information flowing through said first power portion from said first interruptible path of said main breaker, and said first leg voltage meter being capable of outputting said voltage information across said first power leg; and
wherein said temporary electrical power flowing through said second power leg is monitored by said second leg amp meter and said second leg voltage meter, said second leg amp meter being capable of outputting current information flowing through said second power portion from said second interruptible path of said main breaker, and said second leg voltage meter being capable of outputting said voltage information across said second power leg.

8. The portable apparatus of claim 7, wherein said first leg amp meter, said second leg amp meter, said first leg voltage meter, and said second leg voltage meter are combined into a single computerized unit with a display.

9. The portable apparatus of claim 7, wherein said first leg electrical plugs and said second leg electrical plugs are color coded.

10. The portable apparatus of claim 7, wherein said first leg electrical plugs and said second leg electrical plugs are tamper resistant.

11. The portable apparatus of claim 7, wherein said first leg electrical plugs and said second leg electrical plugs are ground-fault circuit interrupter (GFCI) protected.

12. The portable apparatus of claim 7, wherein said first leg amp meter and said first leg voltage meter are a combined first leg amp-voltage meter, and wherein said second leg amp meter and said second leg voltage meter are a combined second leg amp-voltage meter.

\* \* \* \* \*